US012069597B2

(12) United States Patent
Ji et al.

(10) Patent No.: US 12,069,597 B2
(45) Date of Patent: Aug. 20, 2024

(54) PDSCH RATE-MATCHING IN NTN

(71) Applicant: QUALCOMM Incorporated, San Diego, CA (US)

(72) Inventors: Lianghai Ji, San Diego, CA (US); Huilin Xu, Temecula, CA (US); Liangping Ma, San Diego, CA (US); Qiang Wu, San Diego, CA (US); Jun Ma, San Diego, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/455,373

(22) Filed: Nov. 17, 2021

(65) Prior Publication Data

US 2023/0156636 A1 May 18, 2023

(51) Int. Cl.
*H04W 56/00* (2009.01)
*H04L 1/00* (2006.01)
(Continued)

(52) U.S. Cl.
CPC ......... *H04W 56/001* (2013.01); *H04L 1/0067* (2013.01); *H04W 28/26* (2013.01);
(Continued)

(58) Field of Classification Search
CPC . H04W 56/001; H04W 28/26; H04W 72/046; H04W 72/23; H04W 84/06; H04L 1/0067; H04B 7/088; H04B 7/0695
See application file for complete search history.

(56) References Cited

U.S. PATENT DOCUMENTS 11,838,151 B1 * 12/2023 Jones ................. H04L 25/0224
2020/0154341 A1    5/2020 Sun et al.
(Continued)

FOREIGN PATENT DOCUMENTS

CN    115604730 A   *   1/2023
CN    110999115 B   *   9/2023   ........... H04B 7/0695
(Continued)

OTHER PUBLICATIONS

International Search Report and Written Opinion—PCT/US2022/046605—ISA/EPO—Dec. 20, 2022.

*Primary Examiner* — Chi H Pham
*Assistant Examiner* — Vladislav Y Agureyev
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for PDSCH rate-matching in NTN systems. A UE may receive an indication of a subset of one or more SSB beams included in a set of SSB beams having one or more PDCCH resources reserved for potentially scheduling one or more SIBs associated with the set of SSB beams. The UE may further receive a PDSCH associated with resources that overlap with at least a portion of the one or more PDCCH resources associated with the indication of the subset of one or more SSB beams, and rate-match around the one or more PDCCH resources associated with the indication of the subset of one or more SSB beams for receiving the PDSCH.

30 Claims, 14 Drawing Sheets

(51) Int. Cl.
*H04W 28/26* (2009.01)
*H04W 72/044* (2023.01)
*H04W 72/23* (2023.01)
*H04W 84/06* (2009.01)

(52) U.S. Cl.
CPC ......... *H04W 72/046* (2013.01); *H04W 72/23* (2023.01); *H04W 84/06* (2013.01)

(56) References Cited

U.S. PATENT DOCUMENTS

| | | | |
|---|---|---|---|
| 2021/0058913 A1* | 2/2021 | Jang | H04W 24/08 |
| 2021/0185652 A1* | 6/2021 | Rune | H04L 5/0053 |
| 2022/0086914 A1 | 3/2022 | Lee et al. | |
| 2022/0132518 A1* | 4/2022 | Lee | H04W 68/005 |
| 2022/0173864 A1* | 6/2022 | Yu | H04B 7/0695 |
| 2022/0190902 A1* | 6/2022 | Zhang | H04W 56/001 |
| 2022/0225372 A1* | 7/2022 | Kim | H04L 27/261 |
| 2022/0345246 A1* | 10/2022 | Nimbalker | H04L 1/004 |
| 2023/0007625 A1* | 1/2023 | Reial | H04W 68/00 |
| 2023/0032356 A1* | 2/2023 | Yan | H04B 7/0695 |
| 2023/0060894 A1* | 3/2023 | Rastegardoost | H04W 56/001 |
| 2023/0140729 A1* | 5/2023 | He | H04W 56/0015 370/329 |
| 2023/0262672 A1* | 8/2023 | Lin | H04L 5/0007 370/329 |
| 2023/0300645 A1* | 9/2023 | Kwak | H04L 5/0091 370/242 |
| 2023/0337313 A1* | 10/2023 | Yi | H04L 5/0048 |

FOREIGN PATENT DOCUMENTS

| | | | | |
|---|---|---|---|---|
| EP | 3962200 A1 * | 3/2022 | | H04L 5/0044 |
| EP | 4344334 A2 * | 3/2024 | | H04W 56/001 |
| WO | WO-2019242853 A1 * | 12/2019 | | |
| WO | 2020166902 A1 | 8/2020 | | |
| WO | WO-2020259838 A1 * | 12/2020 | | |
| WO | WO-2021067921 A1 * | 4/2021 | | H04L 1/0015 |
| WO | WO-2021231811 A1 * | 11/2021 | | H04W 56/001 |
| WO | WO-2022020060 A1 * | 1/2022 | | |
| WO | WO-2022063277 A1 * | 3/2022 | | |
| WO | WO-2022084924 A1 * | 4/2022 | | |
| WO | WO-2022265141 A1 * | 12/2022 | | |

* cited by examiner

| Serving beam \ Matched beam | SSB beam index 0 | SSB beam index 1 | SSB beam index 2 | SSB beam index 3 | SSB beam index 4 |
|---|---|---|---|---|---|
| SSB beam index 0 | 1 | 1 | 0 | 0 | 0 |
| SSB beam index 1 | 1 | 1 | 1 | 0 | 0 |
| SSB beam index 2 | 0 | 1 | 1 | 1 | 0 |
| SSB beam index 3 | 0 | 0 | 1 | 1 | 1 |
| SSB beam index 4 | 0 | 0 | 0 | 1 | 1 |

PDSCH RATE-MATCHING IN NTN

TECHNICAL FIELD

The present disclosure relates generally to communication systems, and more particularly, to physical downlink shared channel (PDSCH) rate-matching in non-terrestrial networks (NTNs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive an indication of a subset of one or more synchronization signal block (SSB) beams included in a set of SSB beams having one or more physical downlink control channel (PDCCH) resources reserved for potentially scheduling one or more system information blocks (SIBs) associated with the set of SSB beams; receive a physical downlink shared channel (PDSCH) associated with resources that overlap with at least a portion of the one or more PDCCH resources associated with the indication of the subset of one or more SSB beams; and rate-match around the one or more PDCCH resources associated with the indication of the subset of one or more SSB beams for receiving the PDSCH.

In another aspect of the disclosure, a method, a computer-readable medium, and an apparatus are provided. The apparatus may transmit, to a user equipment (UE), an indication of a subset of one or more SSB beams included in a set of SSB beams having one or more PDCCH resources reserved for potentially scheduling one or more SIBs associated with the set of SSB beams; rate-match a PDSCH transmission around the one or more PDCCH resources associated with the indication of the subset of one or more SSB beams based on the one or more PDCCH resources being at least partially overlapped with resources of the PDSCH transmission; and transmit the PDSCH transmission to the UE based on the rate-matching of the PDSCH transmission around the one or more PDCCH resources associated with the indication of the subset of one or more SSB beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a synchronization signal block (SSB) beam index table.

DETAILED DESCRIPTION

Figure 1:
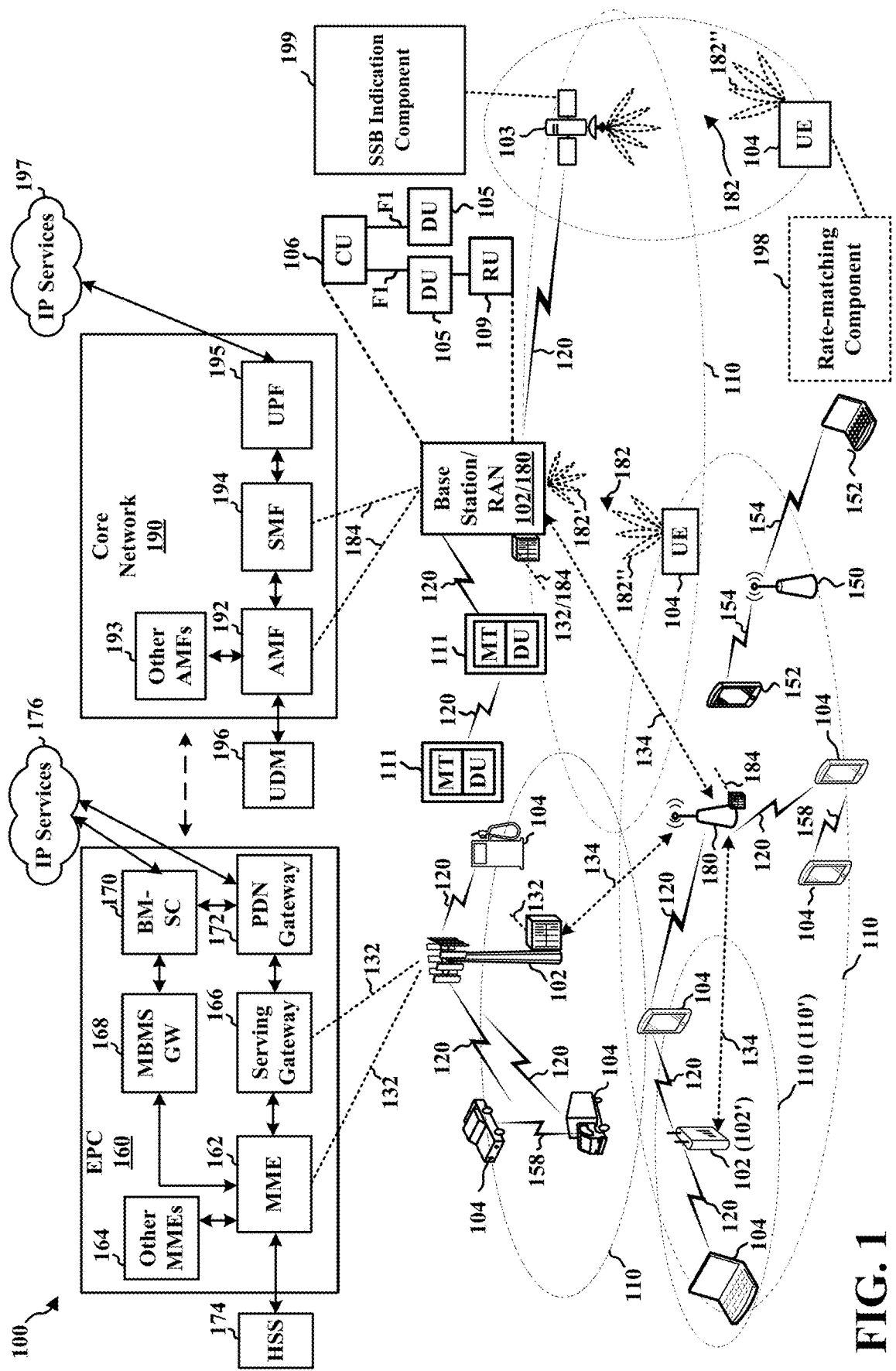
FIG. 1 is a diagram illustrating an example of a wireless communications system and an access network.

PDSCH may be scheduled around a set of unavailable resources, such as resources used for PDCCH scheduling a system information block (SIB) #1. The resources for the PDCCH scheduling the SIB1 on each beam of a base station may be considered as unavailable resources. Aspects presented herein provide for a more efficient use of wireless resources by a network device indicated a subset of SSB beams having PDCCH resources reserved for potentially scheduling one or more SIBs associated with the set of SSB beams. The subset may be less that a set of beams for a base station. In some aspects, the network device may be a non-terrestrial network (NTN) device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a rate-matching component 198 configured to receive an indication of a subset of one or more synchronization signal block (SSB) beams included in a set of SSB beams having one or more physical downlink control channel (PDCCH) resources reserved for potentially scheduling one or more system information blocks (SIBs) associated with the set of SSB beams; receive a physical downlink shared channel (PDSCH) associated with resources that overlap with at least a portion of the one or more PDCCH resources associated with the indication of the subset of one or more SSB beams; and rate-match around the one or more PDCCH resources associated with the indication of the subset of one or more SSB beams for receiving the PDSCH. In certain aspects, the base station 180 may include an SSB indication component 199 configured to transmit, to a user equipment (UE), an indication of a subset of one or more SSB beams included in a set of SSB beams having one or more PDCCH resources reserved for potentially scheduling one or more SIBs associated with the set of SSB beams; rate-match a PDSCH transmission around the one or more PDCCH resources associated with the indication of the subset of one or more SSB beams based on the one or more PDCCH resources being at least partially overlapped with resources of the PDSCH transmission; and transmit the PDSCH transmission to the UE based on the rate-matching of the PDSCH transmission around the one or more PDCCH resources associated with the indication of the subset of one or more SSB beams. Although the following description may be focused on 5G NR, the concepts described herein may be applicable to other similar areas, such as LTE, LTE-A, CDMA, GSM, and other wireless technologies.

Figures 2A, 2B, 2C, 2D:
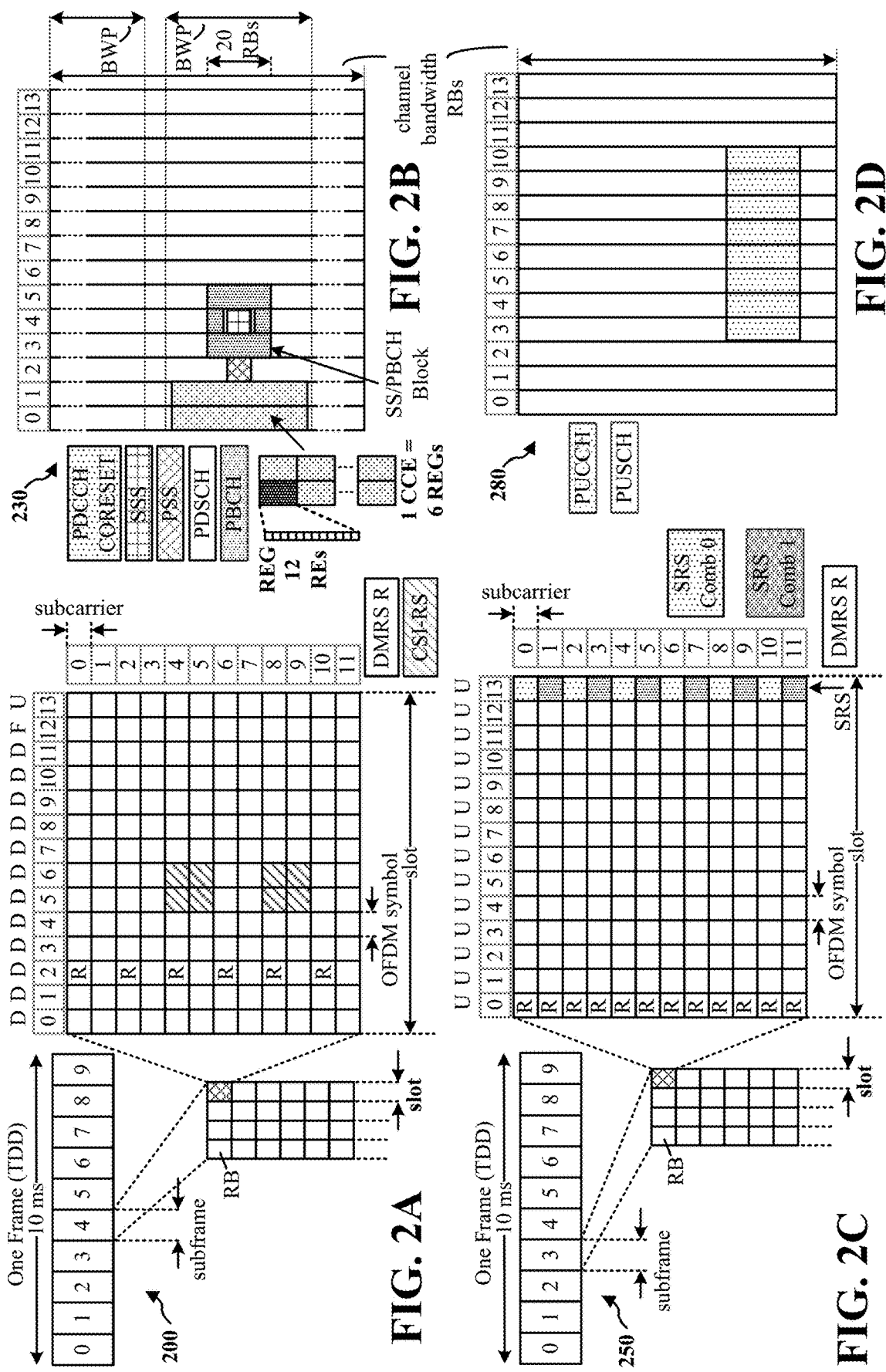
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^\mu*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
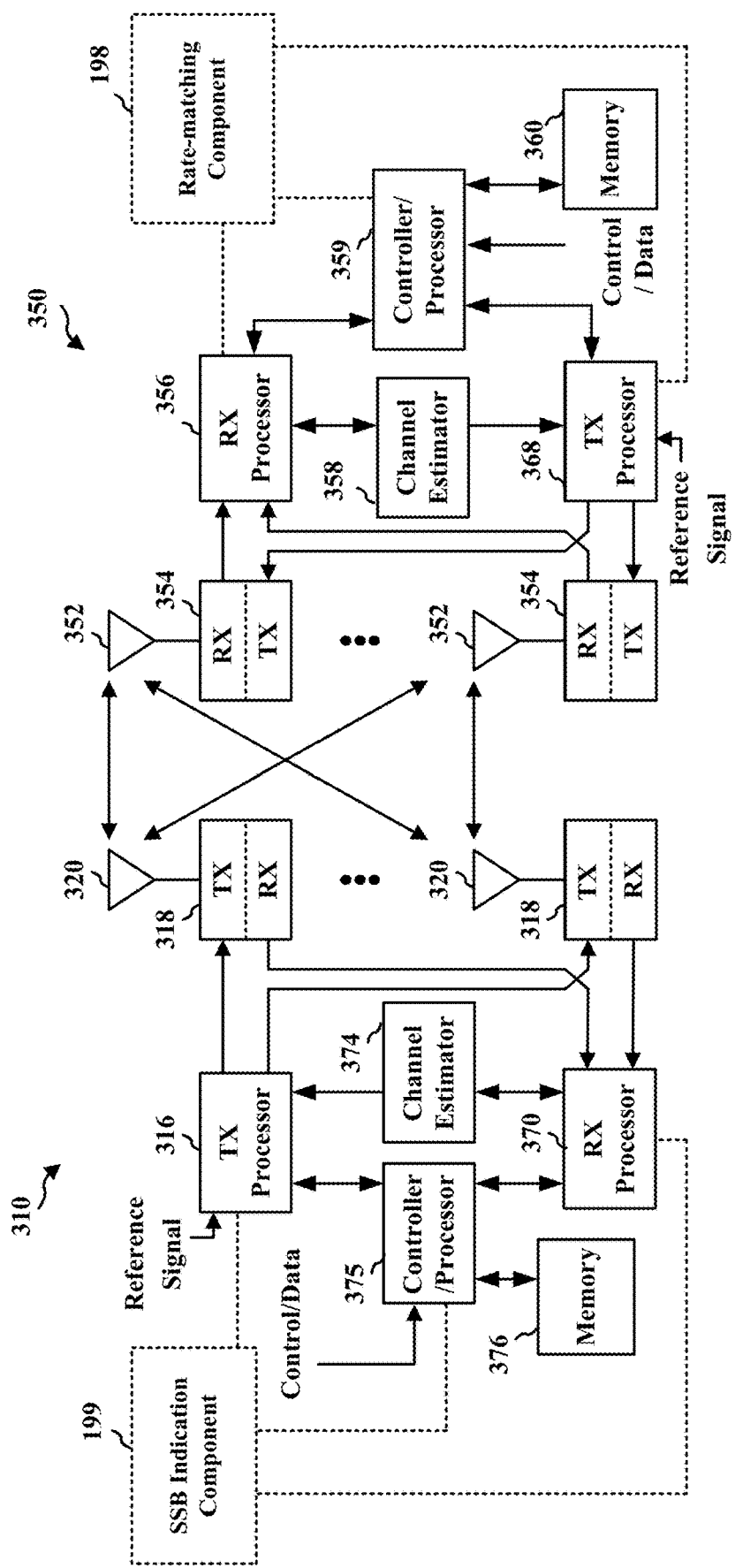
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate-matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet et reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the rate-matching component 198 of FIG. 1.

At least one of the TX processor 316, the RX processor 370, and the controller/processor 375 may be configured to perform aspects in connection with the SSB indication component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
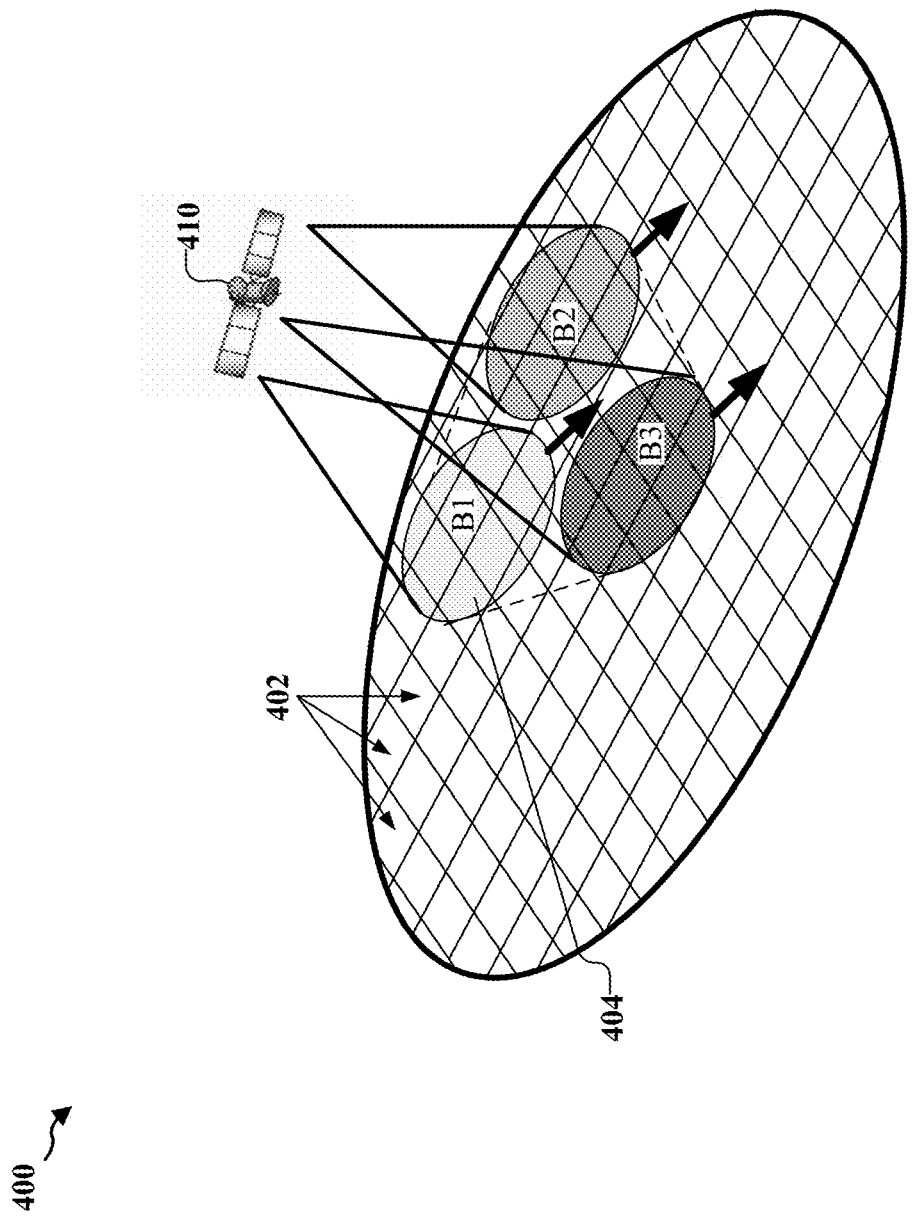
FIG. 4 illustrates radio cells produced by a non-terrestrial network (NTN) device.

FIG. 4 illustrates radio cells produced by a non-terrestrial network (NTN) device 410 over an area 400 that includes a number of Earth-fixed cells 402, as presented herein. A radio cell may comprise a single beam or multiple beams, e.g., all beams in a radio cell may use the same frequency or a radio cell may comprise one beam for each frequency in a set of different frequencies. For example, beams B1, B2, and B3 may support three separate radio cells (one beam per radio cell) or may collectively support a single radio cell (e.g., a radio cell 404 shown with dotted lines). A radio cell may or may not cover a single contiguous area.

Radio beams and radio cells produced by the NTN device 410 may not align with cells used by terrestrial wireless networks, e.g., NR terrestrial cells or LTE terrestrial cells. For example, in an urban area, a radio beam or radio cell produced by the NTN device 410 may overlap with many terrestrial cells. When supporting NTN access to a wireless network, radio beams and radio cells produced by the NTN device 410 may be hidden from the core network.

In the example of FIG. 4, cell B1 may be moving based on movements of the NTN device 410 and corresponding movements associated with the beam projected by the NTN device 410. The NTN device 410 may be transparent or may be a relay for base stations on the ground (e.g., as described in connection with the example of FIG. 5A). In examples, the NTN device 410 may be a base station, as described in connection with the examples of FIGS. 5B-5C.

In the example of FIG. 4, because the cell B1 is being projected by the NTN device 410, the coverage area of the cell B1 may change over time. That is, at time T1, the cell B1 may be served by the NTN device 410. At a later time (e.g., at time T2), the cell B1 may be turned off and a new cell may be activated. The new cell may be located in the same region as the first cell (e.g., the cell B1). The new cell may be projected by the NTN device 410 or may be projected by a second NTN device (e.g., second satellite).

Figure 5A:
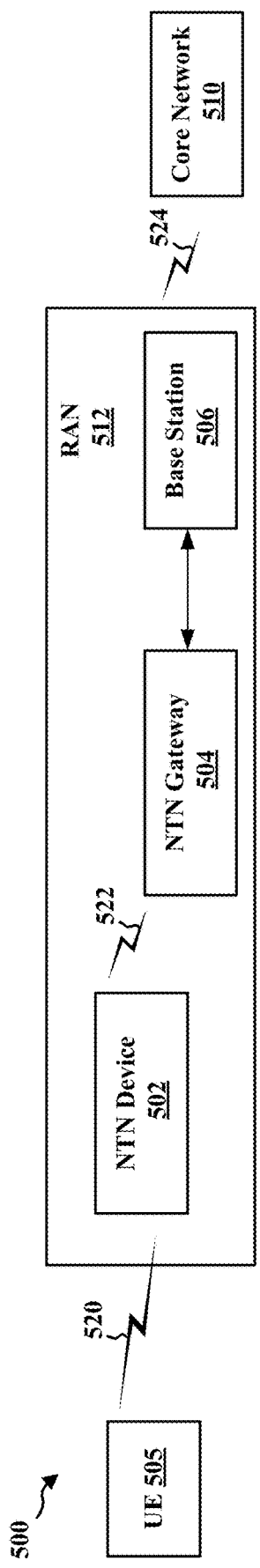
FIG. 5A illustrates a network architecture with transparent payloads.

FIG. 5A illustrates an example network architecture 500 capable of supporting NTN access, e.g., using 5G NR, as presented herein. Although the aspects are described using the example of 5G NR, the concepts presented herein may also be applied for other types of core networks. FIG. 5A illustrates a network architecture with transparent payloads. While aspects of FIG. 5A illustrate a 5G-based network, similar network implementations and configurations may be used for other communication technologies, such as 3G, 4G LTE, etc.

The network architecture 500 of FIG. 5A includes a UE 505, an NTN device 502, an NTN gateway 504 (sometimes referred to as "gateways," "earth stations," or "ground stations"), and a base station 506 having the capability to communicate with the UE 505 via the NTN device 502. The NTN device 502, the NTN gateway 504, and the base station 506 may be part of a RAN 512 (e.g., an NG RAN).

The base station 506 may be a network node that corresponds to the base station 310 of FIG. 3. The network architecture 500 is illustrated as further including a core network 510. In some aspects, the core network 510 may include a number of Fifth Generation (5G) networks including 5G Core Networks (5GCNs) and may correspond to the core network 190 described in connection with FIG. 1. The core network 510 may be public land mobile networks (PLMN) that may be located in the same country or in different countries. In some aspects, the core network may be 5GCNs.

Permitted connections in the network architecture 500 with transparent payloads illustrated in FIG. 5A, allow the base station 506 to access the NTN gateway 504 and the core network 510. In some examples, the base station 506 may be shared by multiple PLMNs. Similarly, the NTN gateway 504 may be shared by more than one base station.

FIG. 5A provides a generalized illustration of various components, any or all of which may be utilized as appropriate, and each of which may be duplicated or omitted, as necessary. Specifically, although the example of FIG. 5A includes one UE 505, it should be understood that many UEs (e.g., hundreds, thousands, millions, etc.) may utilize the network architecture 500. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 is configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a gNB, a "satellite node", a satellite NodeB (sNB), "satellite access node", etc. The base station 506 may not be the same as terrestrial network gNBs, but may be based on a terrestrial network gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-GEO devices) and associated mobility of the UE 505. The base station 506 may assist in the handover (or transfer) of the NTN device 502 between different NTN gateways, different base stations, and between different countries. In some examples, the base station 506 may be separate from the NTN gateway 504, e.g., as illustrated in the example of FIG. 5A. In other examples, the base station 506 may include or may be combined with one or more NTN gateways, e.g., using a split architecture. For example, with a split architecture, the base station 506 may include a Central Unit (CU), such as the example CU 106 of FIG. 1, and the NTN gateway 504 may include or act as Distributed Unit (DU), such as the example DU 105 of FIG. 1. The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502 may: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5A may impact the communication system as follows. The core network 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite television, fixed Internet access) with 5G NR mobile access for UEs added in a transparent manner. This may enable legacy NTN devices to be used and may avoid the need to deploy a new type of NTN device. Further, the base station 506 may be fixed and may be configured to support one country or multiple countries and one or more PLMNs in that one country or in those multiple countries. The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial network gNB. Additionally, a coverage area of the base station 506 may be much larger than the coverage area of a terrestrial network base station.

In some implementations, the radio beam coverage of the NTN device 502 may be large, e.g., up to or greater than 4000 kms across, and may provide access to more than one country. The base station 506 may be shared by multiple base stations, and the base station 506 may be shared by multiple core networks in separate PLMNs located in the same country or in different countries.

In the illustrated example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

Figure 5B:
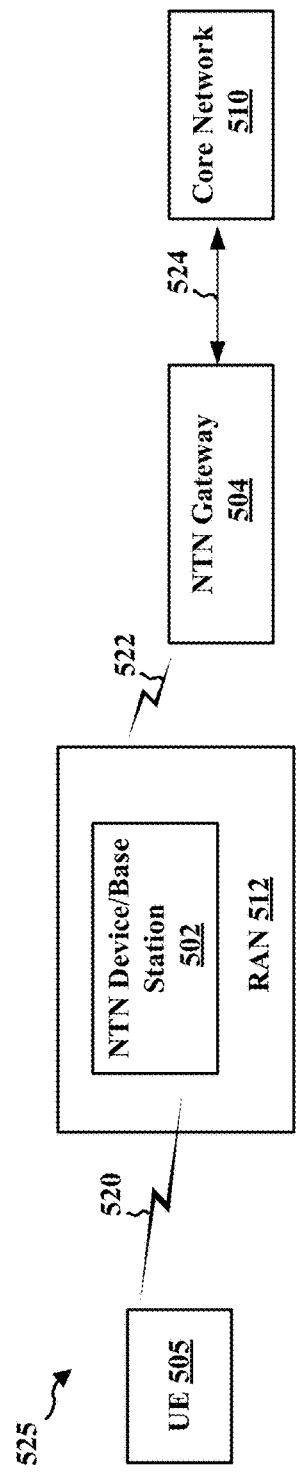
FIG. 5B illustrates a network architecture capable of supporting NTN access.

FIG. 5B shows a diagram of a network architecture 525 capable of supporting NTN access, e.g., using 5G NR, as presented herein. The network architecture 525 shown in FIG. 5B is similar to that shown in FIG. 5A, like designated elements being similar or the same. FIG. 5B, however, illustrates a network architecture with regenerative payloads, as opposed to transparent payloads shown in FIG. 5A. A regenerative payload, unlike a transparent payload, includes an on-board base station (e.g., includes the functional capability of a base station), and is referred to herein as an NTN device/base station 502. The on-board base station may be a network node that corresponds to the base station 310 in FIG. 3. The RAN 512 is illustrated as including the NTN device/base station 502. Reference to the NTN device/base station 502 may refer to functions related to communication with the UE 505 and the core network 510 and/or to functions related to communication with the NTN gateway 504 and with the UE 505 at a physical radio frequency level.

An on-board base station may perform many of the same functions as the base station 506 as described previously. For example, the NTN device/base station 502 may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device/base station 502 may also support signaling connections and voice and data bearers to the UE 505 and may support handover of the UE 505 between different radio cells for the NTN device/base station 502 and between different NTN device/base stations. The NTN device/base station 502 may assist in the handover (or transfer) of the UE 505 between different NTN gateways, different control networks, and between different countries. The NTN device/base station 502 may hide or obscure specific aspects of the NTN device/base station 502 from the core network 510, e.g., by interfacing to the core network 510 in the same way or in a similar way to a terrestrial network base station. The NTN device/base station 502 may further assist in sharing of the NTN device/base station 502 over multiple countries. The NTN device/base station 502 may communicate with one or more NTN gateways and with one or more core networks via the NTN gateway 504. In some aspects, the NTN device/base station 502 may communicate directly with other NTN device/base stations using Inter-Satellite Links (ISLs), which may support an Xn interface between any pair of NTN device/base stations.

With LEO devices, the NTN device/base station 502 may manage moving radio cells with coverage in different countries at different times. The NTN gateway 504 may be connected directly to the core network 510, as illustrated. The NTN gateway 504 may be shared by multiple core networks, for example, if NTN gateways are limited. In some examples the core network 510 may need to be aware of coverage area(s) of the NTN device/base station 502 in order to page the UE 505 and to manage handover. Thus, as can be seen, the network architecture 525 with regenerative payloads may have more impact and complexity with respect to both the NTN device/base station 502 and the core network 510 than the network architecture 500 including transparent payloads, as shown in FIG. 5A.

Support of regenerative payloads with the network architecture 525 shown in FIG. 5B may impact the network architecture 525 as follows. The core network 510 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 505). If fixed tracking areas and fixed cells are supported, the core network 510 may map any fixed tracking area to one or more NTN device/base stations with current radio coverage of the fixed tracking area when performing paging of the UE 505 that is located in this fixed tracking area. This could include configuration in the core network 510 of long term orbital data for the NTN device/base station 502 (e.g., obtained from an operator of the NTN device/base station 502) and could add significant new impact to core network 510.

The NTN device/base station 502 may support regulatory and other requirements for multiple countries. A GEO device coverage area may include several or many countries, whereas a LEO device or an MEO device may orbit over many countries. Support of fixed tracking areas and fixed cells may then include the NTN device/base station 502 configured with fixed tracking areas and fixed cells for an entire worldwide coverage area. Alternatively, the core network 510 may support fixed tracking areas and fixed cells for the associated PLMN to reduce complexity of the NTN device/base station 502 and at the expense of more complexity at the core network 510. Additionally, ISLs between NTN device/base stations may change dynamically as relative NTN device/base station 502 positions change.

In the illustrated example of FIG. 5B, a service link 520 may facilitate communication between the UE 505 and the NTN device/base station 502, a feeder link 522 may facilitate communication between the NTN device/base station 502 and the NTN gateway 504, and an interface 524 may facilitate communication between the NTN gateway 504 and the core network 510. The service link 520 may be implemented by the NR-Uu interface. The feeder link 522 may be implemented by the NG interface over SRI. The interface 524 may be implemented by the NG interface.

Figure 5C:
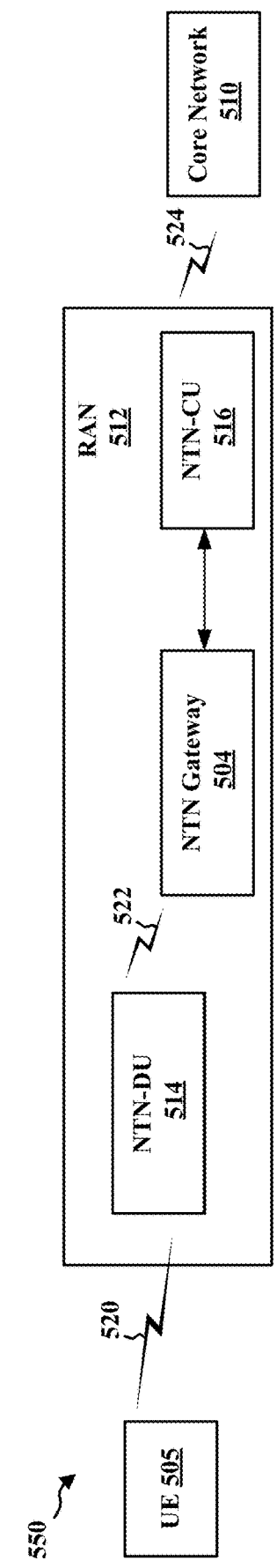
FIG. 5C illustrates a network architecture capable of supporting NTN access.

FIG. 5C shows a diagram of a network architecture 550 capable of supporting NTN access, e.g., using 5G NR, as presented herein. The network architecture shown in FIG. 5C is similar to that shown in FIGS. 5A and 5B, like designated elements being similar or the same. FIG. 5C, however, illustrates a network architecture with regenerative payloads, as opposed to transparent payloads, as shown in FIG. 5A, and with a split architecture for the base station. For example, the base station may be split between a Central Unit (CU), such as the CU 106 of FIG. 1, and a Distributed Unit (DU), such as the DU 105 of FIG. 1. In the illustrated example of FIG. 5C, the network architecture 550 includes an NTN-CU 516, which may be a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the base station 310 in FIG. 3.

The NTN-DU 514 communicates with the NTN-CU 516 via the NTN gateway 504. The NTN-CU 516 together with the NTN-DU 514 perform functions, and may use internal communication protocols, which are similar to or the same as a gNB with a split architecture. In the example, the NTN-DU 514 may correspond to and perform functions similar to or the same as a gNB Distributed Unit (gNB-DU), while the NTN-CU 516 may correspond to and perform functions similar to or the same as a gNB Central Unit (gNB-CU). However, the NTN-CU 516 and the NTN-DU 514 may each include additional capability to support the UE 505 access using NTN devices.

The NTN-DU 514 and the NTN-CU 516 may communicate with one another using an F1 Application Protocol (F1AP), and together may perform some or all of the same functions as the base station 506 or the NTN device/base station 502 as described in connection with FIGS. 5B and 5C, respectively.

The NTN-DU 514 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more NR radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and any terrestrial base station.

The NTN-DU 514 together with the NTN-CU 516 may: (i) support signaling connections and voice and data bearers to the UE 505; (ii) support handover of the UE 505 between different radio cells for the NTN-DU 514 and between different NTN-DUs; and (iii) assist in the handover (or transfer) of NTN devices between different NTN gateways, different core networks, and between different countries. The NTN-CU 516 may hide or obscure specific aspects of the NTN devices from the core network 510, e.g., by interfacing to the core network 510 in the same way or in a similar way to a terrestrial network base station. The NTN-CU 516 may further assist in sharing of NTN devices over multiple countries.

In the network architecture 550 of FIG. 5C, the NTN-DU 514 that communicates with and is accessible from an NTN-CU may change over time with LEO devices. With the split base station architecture, the core network 510 may connect to NTN-CUs that are fixed and that do not change over time, which may reduce difficulty with paging of the UE 505. For example, the core network 510 may not need to know which NTN-DU is needed for paging the UE 505. The network architecture with regenerative payloads with a split base station architecture may thereby reduce the core network 510 impact at the expense of additional impact to the NTN-CU 516.

Support of regenerative payloads with a split base station architecture, as shown in FIG. 5C, may impact the network architecture 550 as follows. The impact to the core network 510 may be limited as for the transparent payloads (e.g., the NTN device 502) discussed above. For example, the core network 510 may treat a satellite RAT in the network architecture 550 as a new type of RAT with longer delay, reduced bandwidth and/or higher error rate. The impact on the NTN-DU 514 may be less than the impact on NTN device/base stations (e.g., the NTN device/base station 502 with a non-split architecture), as discussed above in reference to FIG. 5B. The NTN-DU 514 may manage changing association with different (fixed) NTN-CUs. Further, the NTN-DU 514 may manage radio beams and radio cells. The NTN-CU 516 impacts may be similar to the impact of the base station 506 for a network architecture with transparent payloads, as discussed above, except for extra impacts to manage changing associations with different NTN-DUs and reduced impacts to support radio cells and radio beams, which may be transferred to the NTN-DU 514.

Referring again to the example of FIG. 4, the NTN device 410 may correspond to a high altitude platform system (HAPS) that serves one or more UEs on the ground. The NTN device 410 may project beams toward receivers on the ground to provide a serving area within the area 400 for a cell of the NTN device 410. The NTN device 410 may use directional beams for communication with one or more ground-based devices. Due to the aerial distance of the NTN device, a coverage area of a beam may have a larger size, e.g., a larger footprint than a beam of a terrestrial network device. For example, the NTN device 410 may project a single beam per cell or multiple beams per cell to provide the serving area. Each beam projected by the NTN device 410 may have a corresponding beam footprint on the ground. Thus, the cell of the NTN device 410 may have an area associated with one or more beam footprints. In an example, the NTN device 410 may project beams B1, B2, and B3, which may each have corresponding beam footprints that comprise the radio cell 404 of the NTN device 410, where the radio cell 404 may correspond to the serving area. The footprints of beams B1, B2, and B3 may be overlapping footprints, partially overlapping footprints, or non-overlapping footprints in various configurations.

In order to receive, from the NTN device 410, a PDSCH scheduled by a DCI, the UE may perform rate-matching around REs that are determined to be unavailable for a PDSCH reception. "Rate-matching" refers to a technique where a communication device determines and/or utilizes resources for a second procedure that do not overlap with resources for a first procedure. For example, if the UE 802 rate-matches around PDCCH resources for receiving a PDSCH, the UE 802 may determine the resources used for the PDCCH and exclude such resources for the PDSCH reception. The excluded resources may correspond to unavailable REs that are reserved for other purposes (e.g., associated with the PDCCH). Hence, only available REs (e.g., not used for the PDCCH) may be used for receiving the PDSCH scheduled by the DCI.

DCI received by the UE may point to particular PDSCH resources, such as resources of one or more RBs. The one or more RBs may include a first subset of REs that are reserved for the other purposes (e.g., associated with the PDCCH) and a second subset of REs that may be used for receiving the PDSCH. Hence, the UE may determine that the first subset of REs is not available for the PDSCH reception, so that when the UE receives a TB associated with the PDSCH scheduled by the DCI, the UE may rate-match around the unavailable REs for receiving the PDSCH. That is, the UE may skip the REs that are not available for receiving the PDSCH, such that the UE may receive/decode information via the REs that are available for receiving the PDSCH.

The first subset of REs corresponding to the unavailable REs may be reserved or used for a potential PDCCH to schedule a SIB. For example, the PDCCH may correspond to at least part of the first subset of REs for scheduling a SIB1. Thus, in order to receive, from the NTN device 410, the PDSCH scheduled by the DCI, the UE may perform rate-matching around the resources used for the PDCCH to schedule the SIB. A time-and-frequency domain location of the PDCCH resources for scheduling the SIB may be indicated based on a ControlResourceSet parameter and/or a searchSpace parameter. For example, a time-and-frequency domain location of the PDCCH resources for scheduling the SIB1 may be indicated based on a ControlResourceSetZero parameter and/or a searchSpaceZero parameter.

The UE may be configured with higher layer parameters for indicating REs that are not available for PDSCH reception. For instance, within a BWP, a frequency domain resource of a CORESET may be configured, e.g., based on a ControlResourceSet with a controlResourceSetId or a ControlResourceSetZero. A time domain resource may also be determined, e.g., based on the higher layer parameters, such as monitoringSlotPeriodicityAndOffset, duration, and monitoringSymbolsWithinSlot of search-space-sets configured by a SearchSpace and a time domain resource of search-space-set zero configured by searchSpaceZero associated with the CORESET as well as a CORESET duration configured by the ControlResourceSet with the controlResourceSetId or the ControlResourceSetZero. The resources that are not available for the PDSCH reception may be included in one or two groups of resource sets (e.g., associated with the higher layer parameters rateMatchPatternGroup1 and rateMatchPatternGroup2).

The coverage of the radio cell 404 may be served by different beams of the NTN device 410, and some SIBs (e.g. SIB1) may be broadcasted by the NTN device 410 over the different beams (e.g. B1, B2, and B3), such that UEs that are served by/camped on the radio cell 404 may receive the SIB, regardless of the transmit beam having a footprint that may cover the location of a particular UE. In order to broadcast the SIB in a particular cell coverage area, each of the transmit beams of the NTN device 410 may transmit a DCI over PDCCH, where the DCI may indicate the PDSCH resource carrying the broadcasted SIB from the particular transmit beam. When a UE is scheduled by the DCI to receive a PDSCH, the UE may determine whether the resources used for the PDCCH to schedule the SIB at least partially overlap with the PDSCH resources scheduled by the DCI. If so, the UE may rate-match around overlapped REs of the PDSCH resources for performing the PDSCH reception. Accordingly, the REs reserved for the PDCCH to schedule the broadcasted SIB may not be used for the PDSCH reception.

If the broadcasted SIB (e.g. SIB1) is transmitted via each beam of the NTN device 410, the UE may have to rate-match around all of the PDCCH resources used for scheduling the broadcasted SIB over all of the beams. Multi-beam transmissions where the SIB may be broadcast over each beam of the NTN device 410 may be performed so that the UE may receive the PDCCH scheduling the SIB regardless of the transmit beam of the NTN device 410 that is used to serve the UE. The UE may rate-match around the PDCCH resources used for scheduling the broadcasted SIBs over all the beams, such that the resources used for the PDSCH reception do not overlap with the PDCCH scheduling resources of each beam. Otherwise, interference may be generated from the PDCCH resources that collided with resources used by the UE for the PDSCH reception.

In addition to the serving beam of the UE, in NTN configurations the UE may receive a small number of neighboring beams (e.g. one or two neighboring beams) or even no neighboring beams from the NTN device 410 in some cases. For example, if the UE is centralized within a beam footprint, the UE may detect only the serving beam but no other beams from the NTN device 410. If the UE is near an edge of the beam footprint, the UE may detect, e.g., one or two neighboring beams in addition to the serving beam of the UE. In cases where the UE rate-matches around the PDCCH resources for each of the multiple beams transmitted by the NTN device 410, resource waste may be generated in association with the beams that the UE is not expected to receive from the NTN device 410.

Figure 6:
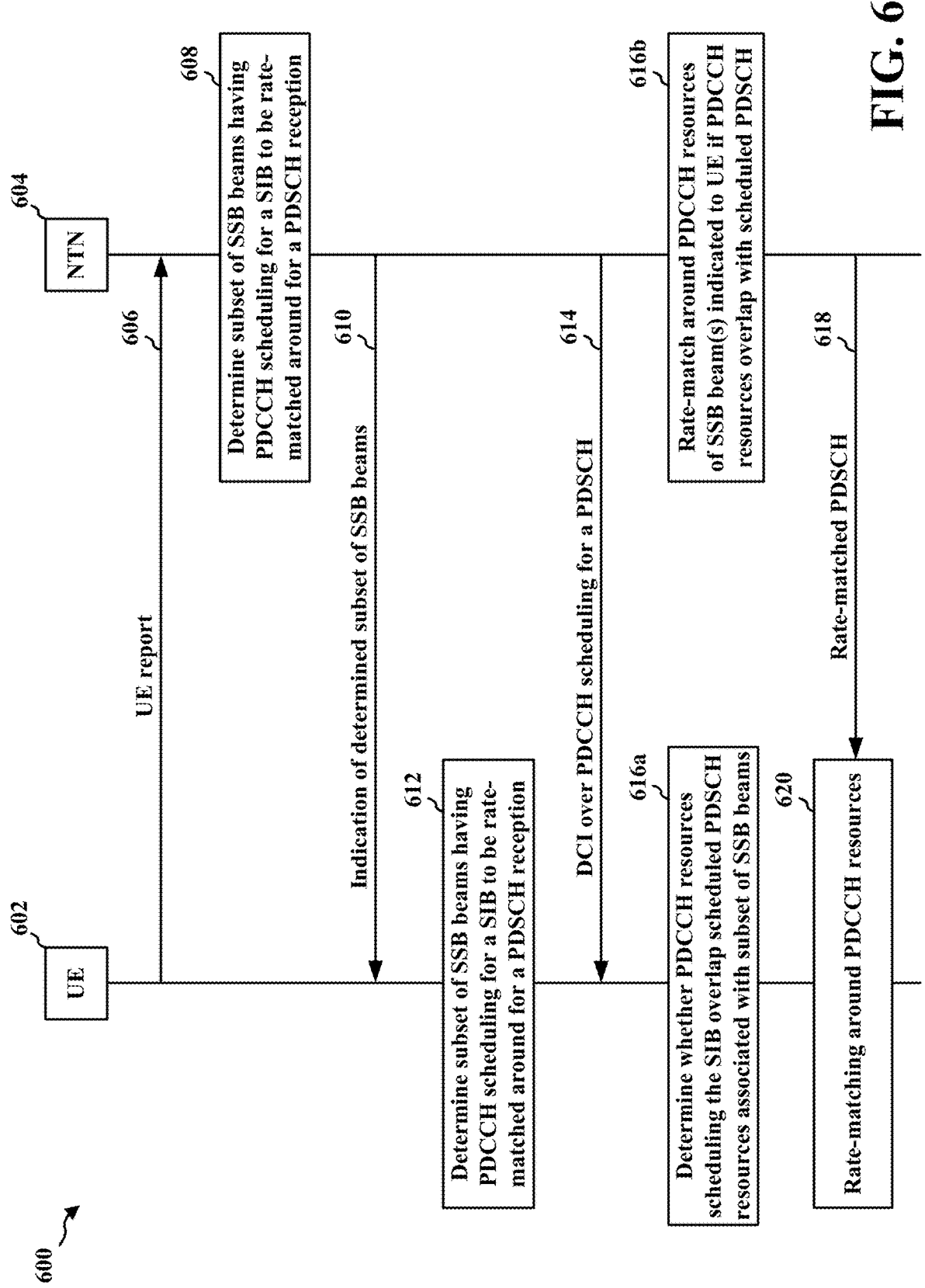
FIG. 6 is a call flow diagram illustrating communication between a UE and a network device.

FIG. 6 is a call flow diagram 600 illustrating communications between a UE 602 and a network device, such as a network device of an NTN 604. While the network device in the diagram 600 is associated with the NTN 604 for exemplary purposes, aspects of the call flow diagram 600 may also be performed in association with terrestrial networks and/or terrestrial network devices.

In examples, the UE 602 may be configured to skip/not perform rate-matching around PDCCH resources of SSB beams that are not expected to be received by the UE 602. The NTN 604 may determine, at 608, a subset of the SSB beams from an overall set of SSB beams having PDCCH scheduling for one or more SIBs, where the PDCCH resources are to be rate-matched around for a PDSCH transmission to the UE 602. The determination, at 608, of the subset of SSB beams may be based on a UE report received, at 606, from the UE 602 or may be based on an independent determination of the NTN 604. The UE report may indicate, e.g., a measured channel condition/quality for one or more channels associated with the subset of SSB beams. The UE report may also be indicative of a location of the UE (e.g., physical/geographic location, environmental location, etc.) and/or beam steering information of the UE. The NTN 604 may determine neighboring beams that may interfere with the serving beam of the UE based on the UE location, UE measurement report, and/or local beam steering information. Thus, the subset of SSB beams may be associated with PDCCH resources that the UE 602 is to rate-match around for receiving the PDSCH from the NTN 604.

The NTN 604 may transmit, at 610, an indication to the UE 602 (e.g., serving UE) of the determined subset of SSB beams. Based on the indication received, at 610, the UE 602 may determine, at 612, a same subset of SSB beams determined, at 608, by the NTN 604 as having PDCCH scheduling for a SIB that is to be rate-matched around for the PDSCH reception by the UE 602. By determining the same subset of SSB beam as the NTN 604 from the indication received, at 610, the UE 602 may ensure that the correct PDCCH resources are being rate-matched around. When the NTN 604 transmits, at 614, a DCI to the UE 602 over the PDCCH resources for scheduling the PDSCH, the UE 602 may determine, at 616*a*, whether the PDCCH resources scheduling a SIB associated with the subset of SSB beams indicated, at 610, by the NTN 604 overlaps with PDSCH resources.

If the PDCCH resources overlap with the PDSCH resources, the UE 602 may rate-match, at 620, around the PDCCH resources for receiving the PDSCH, at 618, from the NTN 604. The PDSCH received, at 618, from the NTN 604 may be rate-matched PDSCH of the NTN 604. That is, the NTN 604 may also perform rate-matching, at 616*b*, around the PDCCH resources of the subset of SSB beam(s) indicated, at 610, to the UE 602 prior to transmitting, at 618, the PDSCH to the UE 602, if the PDCCH resources overlap with the scheduled PDSCH. Therefore, the NTN 604 may transmit, at 618, rate-matched PDSCH to the UE 602.

The PDCCH resources to be rate-matched around may be determined, at 616*a* and/or at 620, by the UE 602, e.g., based on the subset of SSB beam(s) and the configured parameters, such as ControlResourceSet, ControlResourceSetZero, SearchSpace, SearchSpaceZero, etc. In a first example, the indication, at 610, of the determined subset of SSB beam(s) may be broadcast from the NTN 604 over a SIB. In a second example, the indication, at 610, may correspond to a table that indexes the UE 602 from one or more serving beams to the subset of SSB beam(s). For example, referring to FIG. 7, the table 700 may be associated with an SSB beam index for different serving beams. The table 700 may be used, e.g., to map the different serving beams to the SSB beam(s) indicated, at 610, by the NTN 604 for the rate-matching of the PDCCH resources.

The table 700 is an exemplary table that illustrates mappings between a serving beam and a matched beam based on 5 SSB indexes that correspond to SSB beam index 0, SSB beam index 1, SSB beam index 2, SSB beam index 3, and SSB beam index 4. A bit value of 1 for an SSB beam of the table 700 may indicate that rate-matching is to be performed around the associated PDCCH resources reserved and/or used by the corresponding SSB beam to schedule an SIB, whereas a bit value of 0 for a beam of the table 700 may indicate that the rate-matching is to be skipped/not performed for the associated PDCCH resources.

The table 700 may be configured such that rate-matching may be performed for serving beams as well as for neighbor beams that are near the serving beams. For example, the second serving beam row of the table 700 associated with SSB beam index 1 may correspond to 3 beams in the row that have a bit value of 1 to indicate that rate-matching is to be performed around the associated PDCCH resources reserved and/or used for scheduling the SIB(s) via the 3 SSB beams. The middle indicated beam of the 3 beams of the row may correspond to the serving beam, and the first/last indicated beams of the 3 beams of the row that have the bit value of 1 may correspond to the neighboring beams. Thus, rate-matching around the PDCCH resources may not only be performed for the beam associated with the serving beam, but also for neighboring beams associated with the neighboring beams, which may reduce potential interference. Other rows of the table 700 may be similarly configured. For instance, the first row and the last row of the table 700 may be associated with one neighboring beam, whereas rows of the table 700 that are in between the first row and the last row may be associated with two neighboring beams. Different UEs may receive the same indication/table from the NTN 604. Based on respective serving beams for the different UEs, the different UEs may determine respective subsets of SSB beams for rate-matching procedures via bit mapping techniques associated with the table 700.

In further examples, the NTN 604 may broadcast different subsets of SSB beams in the SIBs transmitted from the different SSB beams and, based on the UE 602 receiving an indicated set of SSB beams via a particular serving beam, the UE 602 may determine that the received indicated subset of SSB beams are to be rate-matched around, at 620, for receiving the PDSCH, at 618. The subset of SSB beams indicated, at 610, may be determined, at 612, to include zero, one, or more neighboring SSB beams of the serving beam, e.g. as illustrated via the table 700. In another example, the indication may be transmitted, at 610, to the UE 602 via UE-specific signaling (e.g., RRC message, DCI, MAC-CE, etc.). The UE-specific signaling may provide flexibility for the NTN 604 to communicate with the UE 602 based on a particular configuration of the UE 602. The NTN 604 may determine different subsets of SSB beams for different serving UEs (e.g. UEs in an RRC_CONNECTED state) based on individual conditions of the different serving UEs. For example, if two UEs are served by a same beam, but one of the UEs is located in a center of a serving beam footprint and the other UE is located at an edge of the serving beam footprint, the UE located in the center of the serving beam footprint may be configured to perform rate-matching around the serving beam, whereas the UE located at the edge of the serving beam footprint may be configured to perform rate-matching around both the serving beam and one or more neighboring beams.

The NTN 604 may determine, at 608, and indicate, at 610, multiple subsets of SSB beams to the UE 602, where different subsets of SSB beams may correspond to different validity timings (e.g., time durations for performing the rate-matching based on the indication, at 610). For instance, based on satellite movements, the UE 602 may be served by different beams at different time. Moving beams may cause the UE 602 to be configured by the NTN 604 for different subsets of SSB beams at the different times for rate-matching.

The NTN 604 may also transmit an updated indication to the UE 602 after receiving, at 606, the UE report from the UE 602. For example, the UE 602 may determine that a strength of a neighboring beam has increased, which may be indicated to the NTN 604 for determining whether to update the subset of SSB beams associated with the rate-matching. The UE 602 may be configured such that UE reporting, at 606, may be triggered at the UE 602 based on the UE 602 measuring a beam condition exceeding a configured threshold. The NTN 604 may determine, at 608, to add the beam associated with the triggered UE report to the indicated subset of SSB beams. The threshold associated with the measurement may be configured to the UE 602 by the NTN 604.

The UE 602 may receive, at 618, a PDSCH scheduled by a DCI received, at 614. The UE 602 may rate-match, at 620, around the PDCCH associated with the subset of SSB beams indicated, at 610, so that the PDCCH resources may be used for scheduling one or more SIBs broadcasted over the indicated subset of SSB beams. In examples, rate-matching rules around the PDCCH resources associated with the indicated subset of SSB beams may correspond to same rate-matching rules/protocols that are configured to the UE 602 for other procedures. For example, if the UE 602 is configured by the NTN 604 with a subset of SSB beams having SSB transmission resources to rate-match around, at 620, for receiving, at 618, the PDSCH from the NTN 604, the UE 602 may follow/execute the same rate-matching rule(s) for rate-matching around the PDCCH resources that schedules the one or more broadcasted SIBs. That is, the UE 602 may consider the same subset of SSB beams to rate-match around the SSB transmissions resources and to rate-match around the PDCCH resources that schedules the one or more broadcasted SIBs. In examples, the UE 602 may follow/execute the same rate-matching rule(s), if the UE 602 receives an explicit indication from the NTN 604 (e.g., via a bit in the DCI and/or via an RRC message).

Figure 8:
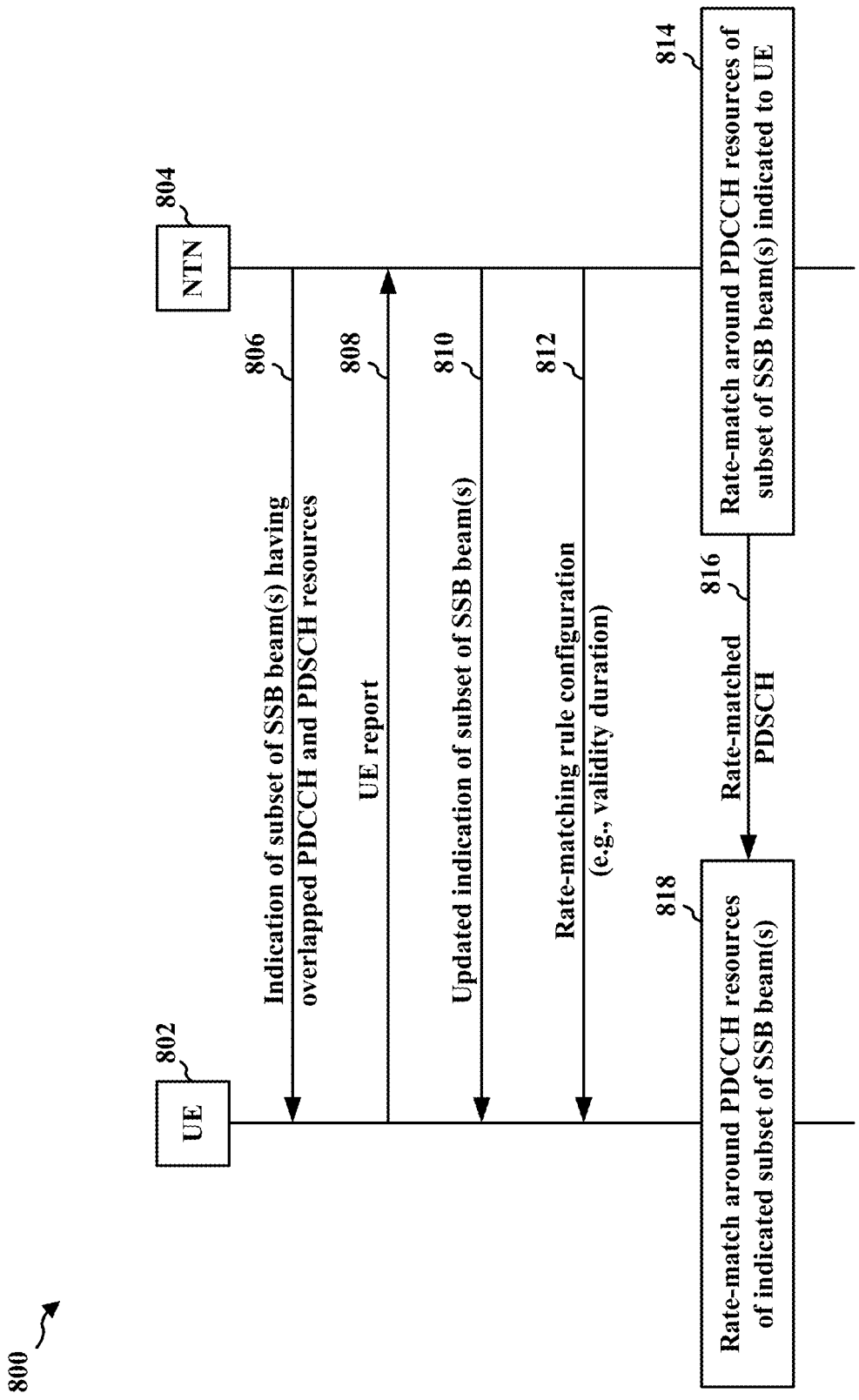
FIG. 8 is a call flow diagram illustrating communication between a UE and a network device.

FIG. 8 is a call flow diagram 800 illustrating communications between a UE 802 and a network device, such as a network device of an NTN 804. While the network device in the diagram 800 is associated with the NTN 804 for exemplary purposes, aspects of the call flow diagram 800 may also be performed in association with terrestrial networks and/or terrestrial network devices.

At 806, the NTN 804 may transmit an indication of a subset of SSB beam(s) to the UE 802, where the subset of SSB beam(s) may have PDCCH resources that potentially overlap with a PDSCH transmission from the NTN 804 to the UE 802.

For example, the PDCCH resources may be reserved for potentially scheduling a SIB1 via the subset of SSB beam(s). The subset of SSB beam(s) may be included in an overall set of SSB beam(s) having other SSB beam(s) (e.g., separate from the subset of SSB beam(s)) with PDCCH resources that may also at least partially overlap with the resources of the PDSCH transmission from the NTN 804 to the UE 802. However, for receiving the PDSCH transmission from the NTN 804, the UE 802 may rate-match around the overlapping PDCCH resources associated with the subset of SSB beams, and the UE 802 may not rate-match around the overlapping PDCCH resources associated with the other SSB beam(s) (e.g., separate from the subset of SSB beam(s)). Thus, since the overlapping PDCCH resources associated with the other SSB beam(s) may not be rate-matched around for the PDSCH transmission, the PDCCH resources may be reused, which may increase the number of REs that may be used for transmitting PDSCH towards the UE. Therefore, the overall cell capacity and/or the spectral efficiency may be improved.

At 808, the UE 802 may transmit a UE report to the NTN 804. For example, the UE 802 may measure a channel condition/quality of a channel between the UE 802 and the NTN 804 and report the measured channel condition/quality to the NTN 804. The UE report transmitted, at 808, to the NTN 804 may also be indicative of a geographic location of the UE 802 and/or beam steering information associated with the UE 802. At 810, the NTN 804 may transmit an updated indication of the subset of SSB beam(s) to the UE 802 based on the UE report received, at 808, from the NTN 804. In further examples, the NTN 804 may transmit, at 810, the updated indication of the subset of SSB beam(s) to the UE 802 based on a determination of the NTN 804 that is independent of the UE report. The updated indication, at 810, may correspond to a second subset of SSB beam(s) that is different from a first subset of SSB beam(s) associated with the indication transmitted, at 806.

At 812, the NTN 804 may transmit a rate-matching rule configuration to the UE 802. The rate-matching rule configuration may be based on the UE report received, at 808, from the UE 802 and/or the indication/updated indication transmitted, at 806/810, to the UE 802. In examples where the UE 802 is already configured by the NTN 804 to rate-match around SSB transmission resources for a subset of one or more SSB beams, the UE 802 may follow/execute a same rate-matching rule for rate-matching around the PDCCH of the same subset of SSB beam(s) that schedule one or more broadcasted SIBs.

The rate-matching rule configuration transmitted, at 812, to the UE 802 may also be associated with a validity duration. The validity duration may be indicative of a time period over which the UE 802 may perform rate-matching around the PDCCH for the subset of SSB beam(s) based on the indication/updated indication received, at 806/810, from the NTN 804. For instance, the NTN 804 may be associated with a satellite constellation that includes a plurality of moving satellites. Based on a time that an SSB beam is received by the UE 802 and a location of a particular satellite at the time the SSB is received, the UE 802 may determine whether the received SSB beam corresponds to a serving beam for the UE 802 (e.g., based on the validity duration). In another example, the footprints of the beams transmitted from the NTN 804 may change due to movement of the NTN 804, which may cause a change of the serving beam for the UE 802. In this case, the NTN 804 may indicate one or more subsets of one or more SSB beams, where each subset may be associated with a validity duration. In one example, the validity duration for applying one subset of the one or more SSB beams may correspond to the time duration that the UE 802 is served by a particular SSB beam of the NTN 804. Thus, based on the validity duration, the NTN 804 may configure the UE 802 with the proper subset of the one or more SSB beams to be rate-matched around by accounting for changes/movements of the beam footprint.

At 814, the NTN 804 may rate-match around PDCCH resources of the subset of SSB beam(s) indicated, at 806/810, to the UE 802. The PDCCH resources may be associated with scheduling one or more SIBs (e.g., SIB1) and may be rate-matched around, at 814, such that the PDSCH resources of a downlink transmission do not use the REs overlapped with the PDCCH resources. Accordingly, the rate-matching, at 814, may reduce interference to the PDCCH resources of the indicated subset of SSB beam(s) that may be caused by a PDSCH transmission. At 816, the NTN 804 may transmit the rate-matched PDSCH to the UE 802. At 818, the UE 802 may similarly rate-match around the PDCCH resources of the indicated subset of SSB beam(s) for receiving, at 816, the rate-matched PDSCH from the NTN 804.

At 816, the NTN 804 may skip rate-matching around other PDCCH resource of non-indicated SSB beam(s) included in the overall set of SSB beam(s) transmitted from the NTN 804, as the UE 802 is not expected to receive the PDCCH from the non-indicated SSB beam(s) from the NTN 804. Hence, other PDCCH transmissions associated with the non-indicated SSB beam(s) may not interfere with the PDSCH transmission and/or reception. At 816, the NTN 804 may transmit the PDSCH transmission(s) to the UE 802 by reusing the REs of the other PDCCH resources associated with non-indicated SSB beam(s), though the other PDCCH resources associated with the non-indicated SSB beam(s) may at least partially overlap with the PDSCH resources. At 818, the UE 802 may similarly skip rate-matching around the other PDCCH resources of the non-indicated SSB beam(s) for receiving, at 816, the PDSCH from the NTN 804.

Figure 9:
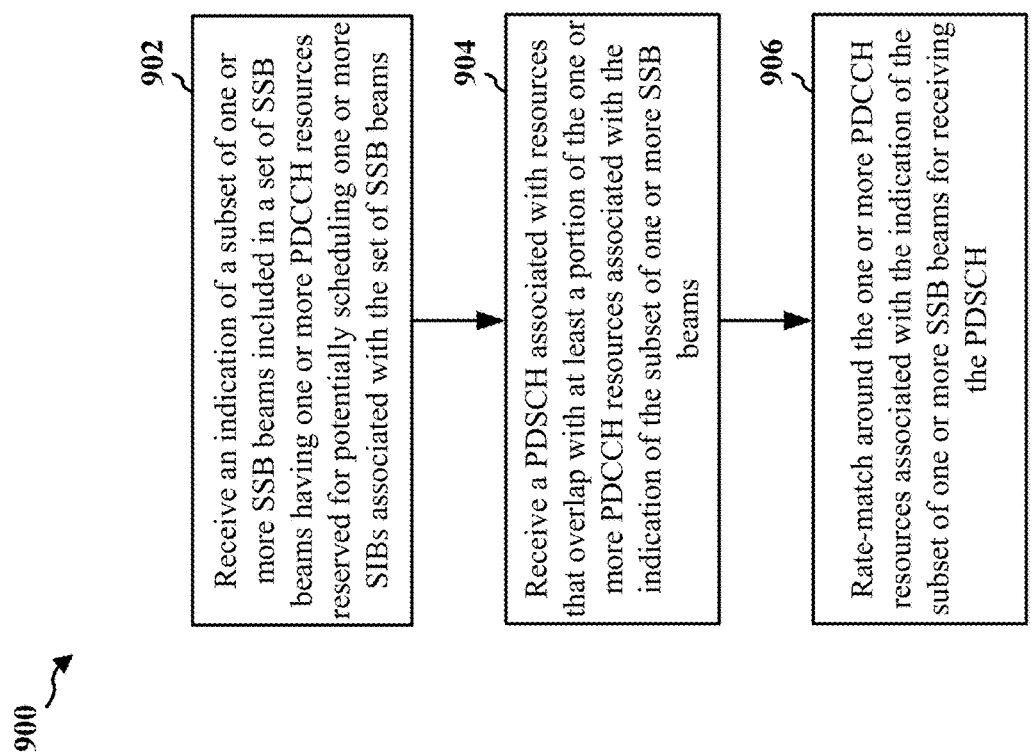
FIG. 9 is a flowchart of a method of wireless communication at a UE.

FIG. 9 is a flowchart 900 of a method of wireless communication. The method may be performed by a UE (e.g., the UE 104, 505, 602, 802; the apparatus 1302; etc.), which may include the memory 360 and which may be the entire UE 104, 505, 602, 802 or a component of the UE 104, 505, 602, 802, such as the TX processor 368, the RX processor 356, and/or the controller/processor 359.

At 902, the UE may receive an indication of a subset of one or more SSB beams included in a set of SSB beams having one or more PDCCH resources reserved for potentially scheduling one or more SIBs associated with the set of SSB beams. For example, referring to FIGS. 6 and 8, the UE 802 may receive, at 806, an indication of a subset of SSB beam(s) from the NTN 804 having overlapped PDCCH and PDSCH resources. The UE 602 may receive, at 610, an indication of a determined set of SSB beams from the NTN 604. The reception, at 902, may be performed by the rate-matcher component 1340 of the apparatus 1302 in FIG. 13.

At 904, the UE may receive a PDSCH associated with resources that overlap with at least a portion of the one or more PDCCH resources associated with the indication of the subset of one or more SSB beams. For example, referring to FIGS. 6 and 8, the UE 602/802 may receive, at 618/816, rate-matched PDSCH from the NTN 604/804 based on the subset of SSB beams indicated at 610/806/810. The reception, at 904, may be performed by the rate-matcher component 1340 of the apparatus 1302 in FIG. 13.

At 906, the UE may rate-match around the one or more PDCCH resources associated with the indication of the subset of one or more SSB beams for receiving the PDSCH. For example, referring to FIGS. 6 and 8, the UE 802 may rate-match, at 818, around the PDCCH resources of the indicated subset of SSB beam(s) to receive, at 816, the rate-matched PDSCH. The UE 602 may similarly rate-match, at 620, around PDCCH resources to receive, at 618, the rate-matched PDSCH from the NTN 604. The rate-matching, at 906, may be performed by the rate-matcher component 1340 of the apparatus 1302 in FIG. 13.

Figure 10:
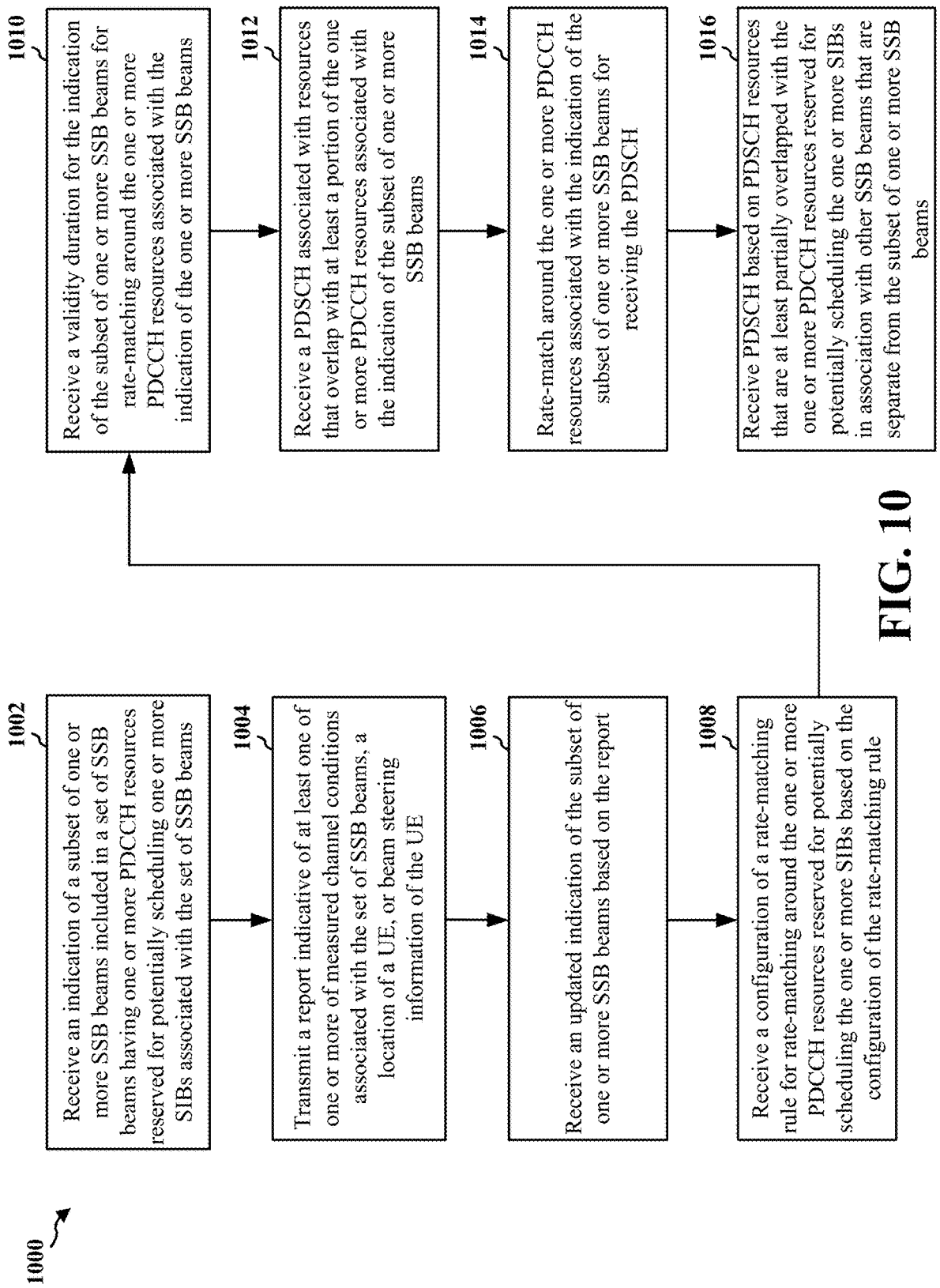
FIG. 10 is a flowchart of a method of wireless communication at a UE.

FIG. 10 is a flowchart 1000 of a method of wireless communication. The method may be performed by a UE (e.g., the UE 104, 505, 602, 802; the apparatus 1302; etc.), which may include the memory 360 and which may be the entire UE 104, 505, 602, 802 or a component of the UE 104, 505, 602, 802, such as the TX processor 368, the RX processor 356, and/or the controller/processor 359.

At 1002, the UE may receive an indication of a subset of one or more SSB beams included in a set of SSB beams having one or more PDCCH resources reserved for potentially scheduling one or more SIBs associated with the set of SSB beams. For example, referring to FIGS. 6 and 8, the UE 802 may receive, at 806, an indication of a subset of SSB beam(s) from the NTN 804 having overlapped PDCCH and PDSCH resources. The UE 602 may receive, at 610, an indication of a determined set of SSB beams from the NTN 604. The indication of the subset of one or more SSB beams may be received, at 610/806, based on a broadcast from the NTN 604/804. The indication of the subset of one or more SSB beams received, at 610/806, may correspond to at least one of a table (e.g., the table 700), a function, or a rule that indexes the UE 602/802 from one or more SSB serving beams to the subset of one or more SSB beams. The indication of the subset of one or more SSB beams may be received, at 610/806, from the one or more SSB serving beams. The indication of the subset of one or more SSB beams received, at 610/806, may be comprised in at least one of an RRC message, a DCI, or a MAC-CE. The reception, at 1002, may be performed by the rate-matcher component 1340 of the apparatus 1302 in FIG. 13.

At 1004, the UE may transmit a report indicative of at least one of one or more of measured channel conditions associated with the set of SSB beams, a location of a UE, or beam steering information of the UE. For example, referring to FIGS. 6 and 8, the UE 602/802 may transmit, at 606/808, a UE report to the NTN 604/804. The transmission, at 1004, may be performed by the rate-matcher component 1340 of the apparatus 1302 in FIG. 13.

At 1006, the UE may receive an updated indication of the subset of one or more SSB beams based on the report. For example, referring to FIG. 8, the UE 802 may receive, at 810, an updated indication of the subset of SSB beam(s) from the NTN 804 based on the UE report transmitted, at 808, to the NTN 804. The reception, at 1006, may be performed by the rate-matcher component 1340 of the apparatus 1302 in FIG. 13.

At 1008, the UE may receive a configuration of a rate-matching rule for rate-matching around the one or more PDCCH resources reserved for potentially scheduling the one or more SIBs based on the configuration of the rate-matching rule. For example, referring to FIG. 8, the UE 802 may receive, at 812, a rate-matching rule configuration from the NTN 804. The rate-matching rule may be for rate-matching, at 818/620, around SSB transmission resources associated with the subset of one or more SSB beams for receiving a downlink transmission. The reception, at 1008, may be performed by the rate-matcher component 1340 of the apparatus 1302 in FIG. 13.

At 1010, the UE may receive a validity duration for the indication of the subset of one or more SSB beams for rate-matching around the one or more PDCCH resources associated with the indication of the one or more SSB beams. For example, referring to FIG. 8, the UE 802 may receive, at 812, a validity duration from the NTN 804 in association with the rate-matching rule configuration for rate-matching, at 818, around PDCCH resources of the indicated subset of SSB beam(s). The reception, at 1010, may be performed by the rate-matcher component 1340 of the apparatus 1302 in FIG. 13.

At 1012, the UE may receive a PDSCH associated with resources that overlap with at least a portion of the one or more PDCCH resources associated with the indication of the subset of one or more SSB beams. For example, referring to FIGS. 6 and 8, the UE 602/802 may receive, at 618/816, rate-matched PDSCH from the NTN 604/804 based on the subset of SSB beams indicated at 610/806/810. That is, the PDSCH may be received, at 618/816, as a rate-matched PDSCH. The UE 602/802 may receive, at 618/816, the PDSCH and the indication, at 610/806/810, of the subset of one or more SSB beams from an NTN device (e.g., 604/804) or a terrestrial network device. The reception, at 1012, may be performed by the rate-matcher component 1340 of the apparatus 1302 in FIG. 13.

At 1014, the UE may rate-match around the one or more PDCCH resources associated with the indication of the subset of one or more SSB beams for receiving the PDSCH. For example, referring to FIGS. 6 and 8, the UE 802 may rate-match, at 818, around the PDCCH resources of the indicated subset of SSB beam(s) to receive, at 816, the rate-matched PDSCH. The UE 602 may similarly rate-match, at 620, around PDCCH resources to receive, at 618, the rate-matched PDSCH from the NTN 604. The rate-matching, at 1014, may be performed by the rate-matcher component 1340 of the apparatus 1302 in FIG. 13.

At 1016, the UE may receive the PDSCH based on PDSCH resources that are at least partially overlapped with the one or more PDCCH resources reserved for potentially scheduling the one or more SIBs in association with other SSB beams that are separate from the subset of one or more SSB beams. For example, referring to FIG. 8, the UE 802 may receive, at 816, the PDSCH from the NTN 804 where the UE 802 may skip, at 818, the rate-matching around the one or more PDCCH resources of non-indicated SSB beam(s). The reception, at 1016, may be performed by the rate-matcher component 1340 of the apparatus 1302 in FIG. 13.

Figure 11:
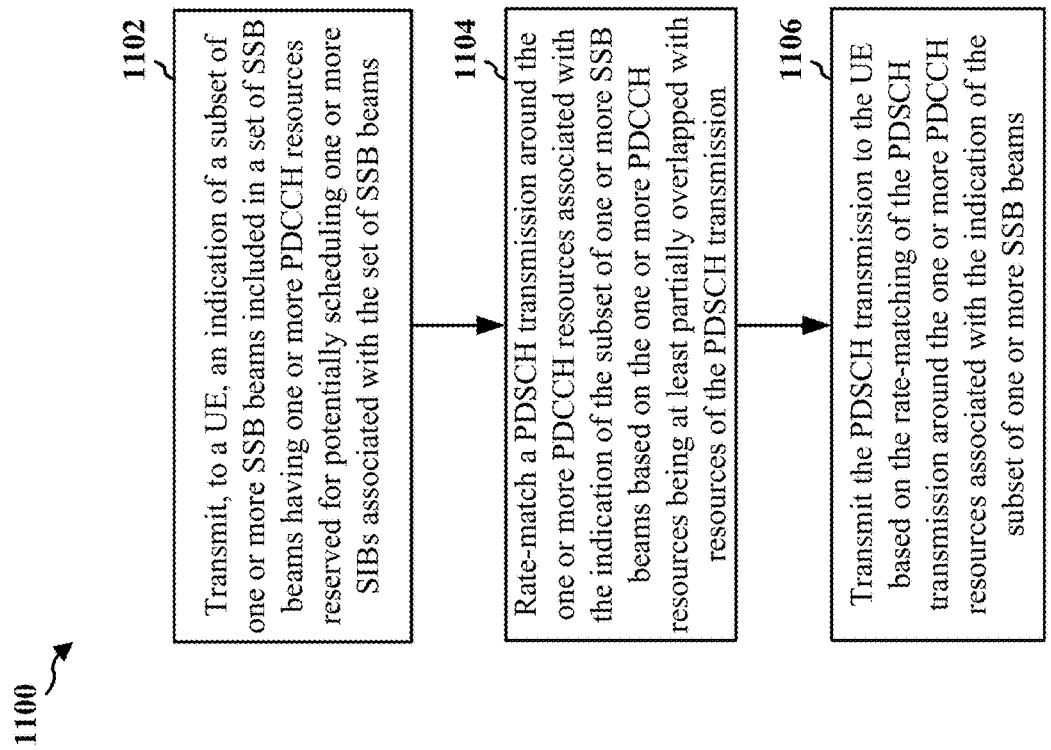
FIG. 11 is a flowchart of a method of wireless communication at a network device.

FIG. 11 is a flowchart 1100 of a method of wireless communication. The method may be performed by a network device (e.g., the network device 103, 410, 502, 604, 804; the apparatus 1402; etc.), which may include the memory 376 and which may be the entire network device 103, 410, 502, 604, 804 or a component of the network device 103, 410, 502, 604, 804, such as the TX processor 316, the RX processor 370, and/or the controller/processor 375.

At 1102, the network device may transmit, to a UE, an indication of a subset of one or more SSB beams included in a set of SSB beams having one or more PDCCH resources reserved for potentially scheduling one or more SIBs associated with the set of SSB beams. For example, referring to FIGS. 6 and 8, the NTN 804 may transmit, at 806, an indication of a subset of SSB beam(s) to the UE 802 having overlapped PDCCH and PDSCH resources. The NTN 604 may transmit, at 610, an indication of a determined set of SSB beams to the UE 602. The transmission, at 1102, may be performed by the SSB indication component 1440 of the apparatus 1402 in FIG. 14.

At 1104, the network device may rate-match a PDSCH transmission around the one or more PDCCH resources associated with the indication of the subset of one or more SSB beams based on the one or more PDCCH resources being at least partially overlapped with resources of the PDSCH transmission. For example, referring to FIGS. 6 and 8, the NTN 804 may rate-match, at 814, around the PDCCH resources of SSB beam(s) indicated to the UE 802 to transmit, at 816, the rate-matched PDSCH to the UE 802. The NTN 604 may similarly rate-match, at 616b, around PDCCH resources of SSB beam(s) indicated to the UE 602, if the PDCCH resources overlap with scheduled PDSCH, e.g., to transmit, at 618, the rate-matched PDSCH to the UE 602. The rate-matching, at 1104, may be performed by the SSB indication component 1440 of the apparatus 1402 in FIG. 14.

At 1106, the network device may transmit the PDSCH transmission to the UE based on the rate-matching of the PDSCH transmission around the one or more PDCCH resources associated with the indication of the subset of one or more SSB beams. For example, referring to FIGS. 6 and 8, the NTN 604/804 may transmit, at 618/816, rate-matched PDSCH from the UE 602/802 based on the subset of SSB beams indicated at 610/806/810. The transmission, at 1106, may be performed by the SSB indication component 1440 of the apparatus 1402 in FIG. 14.

Figure 12:
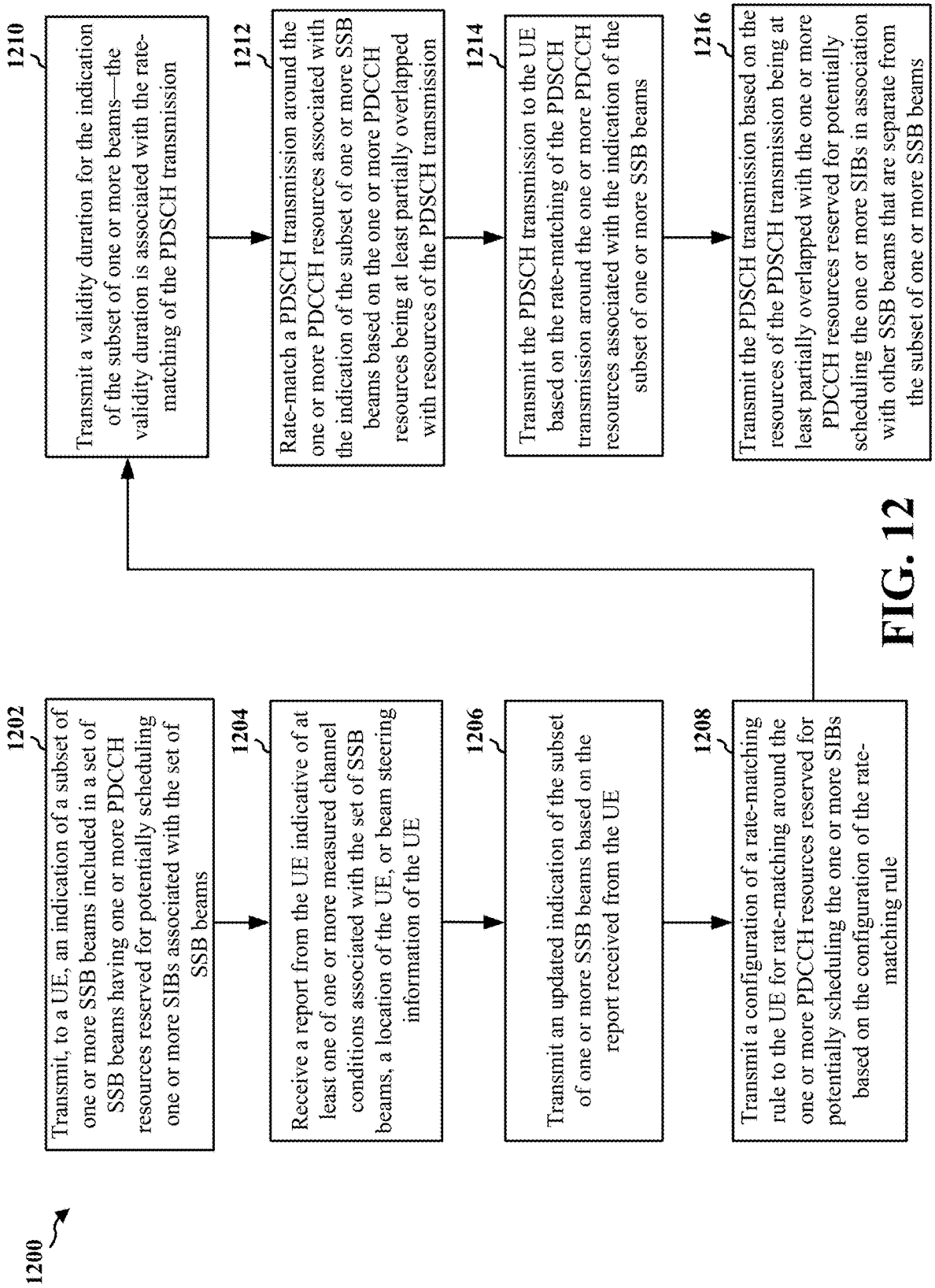
FIG. 12 is a flowchart of a method of wireless communication at a network device.

FIG. 12 is a flowchart 1200 of a method of wireless communication. The method may be performed by a network device (e.g., the network device 103, 410, 502, 604, 804; the apparatus 1402; etc.), which may include the memory 376 and which may be the entire network device 103, 410, 502, 604, 804 or a component of the network device 103, 410, 502, 604, 804, such as the TX processor 316, the RX processor 370, and/or the controller/processor 375.

At 1202, the network device may transmit, to a UE, an indication of a subset of one or more SSB beams included in a set of SSB beams having one or more PDCCH resources reserved for potentially scheduling one or more SIBs associated with the set of SSB beams. For example, referring to FIGS. 6 and 8, the NTN 804 may transmit, at 806, an indication of a subset of SSB beam(s) to the UE 802 having overlapped PDCCH and PDSCH resources. The NTN 604 may transmit, at 610, an indication of a determined set of SSB beams to the UE 602. The indication of the subset of one or more SSB beams may be transmitted, at 610/806, based on a broadcast from the NTN 604/804. The indication of the subset of one or more SSB beams transmitted, at 610/806, may correspond to at least one of a table (e.g., the table 700), a function, or a rule that indexes the UE 602/802 from one or more SSB serving beams to the subset of one or more SSB beams. The indication of the subset of one or more SSB beams may be transmitted, at 610/806, via the one or more SSB serving beams. The indication of the subset of one or more SSB beams transmitted, at 610/806, may be comprised in at least one of an RRC message, a DCI, or a MAC-CE. The transmission, at 1202, may be performed by the SSB indication component 1440 of the apparatus 1402 in FIG. 14.

At 1204, the network device may receive a report from the UE indicative of at least one of one or more measured channel conditions associated with the set of SSB beams, a location of the UE, or beam steering information of the UE. For example, referring to FIGS. 6 and 8, the NTN 604/804 may receive, at 606/808, a UE report from the UE 602/802. The reception, at 1204, may be performed by the SSB indication component 1440 of the apparatus 1402 in FIG. 14.

At 1206, the network device may transmit an updated indication of the subset of one or more SSB beams based on the report received from the UE. For example, referring to FIG. 8, the NTN 804 may transmit, at 810, an updated indication of the subset of SSB beam(s) to the UE 802 based on the UE report received, at 808, from the UE 802. The transmission, at 1206, may be performed by the SSB indication component 1440 of the apparatus 1402 in FIG. 14.

At 1208, the network device may transmit a configuration of a rate-matching rule to the UE for rate-matching around the one or more PDCCH resources reserved for potentially scheduling the one or more SIBs based on the configuration of the rate-matching rule. For example, referring to FIG. 8, the NTN 804 may transmit, at 812, a rate-matching rule configuration to the UE 802. The rate-matching rule may be for rate-matching, at 818/620, around SSB transmission resources associated with the subset of one or more SSB beams for transmitting a downlink transmission. The transmission, at 1208, may be performed by the SSB indication component 1440 of the apparatus 1402 in FIG. 14.

At 1210, the network device may transmit a validity duration for the indication of the subset of one or more beams—the validity duration is associated with the rate-matching of the PDSCH transmission. For example, referring to FIG. 8, the NTN 804 may transmit, at 812, a validity duration to the UE 802 in association with the rate-matching rule configuration for rate-matching, at 818, around PDCCH resources of the indicated subset of SSB beam(s). The transmission, at 1210, may be performed by the SSB indication component 1440 of the apparatus 1402 in FIG. 14.

At 1212, the network device may rate-match a PDSCH transmission around the one or more PDCCH resources associated with the indication of the subset of one or more SSB beams based on the one or more PDCCH resources being at least partially overlapped with resources of the PDSCH transmission. For example, referring to FIGS. 6 and 8, the NTN 804 may rate-match, at 814, around the PDCCH resources of SSB beam(s) indicated to the UE 802 to transmit, at 816, the rate-matched PDSCH to the UE 802. The NTN 604 may similarly rate-match, at 616b, around PDCCH resources of SSB beam(s) indicated to the UE 602, if the PDCCH resources overlap with scheduled PDSCH, e.g., to transmit, at 618, the rate-matched PDSCH to the UE 602. The rate-matching, at 1212, may be performed by the SSB indication component 1440 of the apparatus 1402 in FIG. 14.

At 1214, the network device may transmit the PDSCH transmission to the UE based on the rate-matching of the PDSCH transmission around the one or more PDCCH resources associated with the indication of the subset of one or more SSB beams. For example, referring to FIGS. 6 and 8, the NTN 604/804 may transmit, at 618/816, rate-matched PDSCH from the UE 602/802 based on the subset of SSB beams indicated at 610/806/810. That is, the PDSCH may be transmitted, at 618/816, as a rate-matched PDSCH. The transmission, at 618/816, of the PDSCH and the indication, at 610/806/810, of the subset of one or more SSB beams to the UE 602/802 may be from an NTN device (e.g., 604/804) or from a terrestrial network device. The transmission, at 1214, may be performed by the SSB indication component 1440 of the apparatus 1402 in FIG. 14.

At 1216, the network device may transmit the PDSCH transmission based on the resources of the PDSCH transmission being at least partially overlapped with the one or more PDCCH resources reserved for potentially scheduling the one or more SIBs in association with other SSB beams that are separate from the subset of one or more SSB beams. For example, referring to FIG. 8, the NTN 804 may transmit, at 816, the PDSCH transmission to the UE 802 where the NTN 804 may skip, at 816, the rate-matching around the one or more PDCCH resources of non-indicated SSB beam(s). The transmission, at 1216, may be performed by the SSB indication component 1440 of the apparatus 1402 in FIG. 14.

Figure 13:
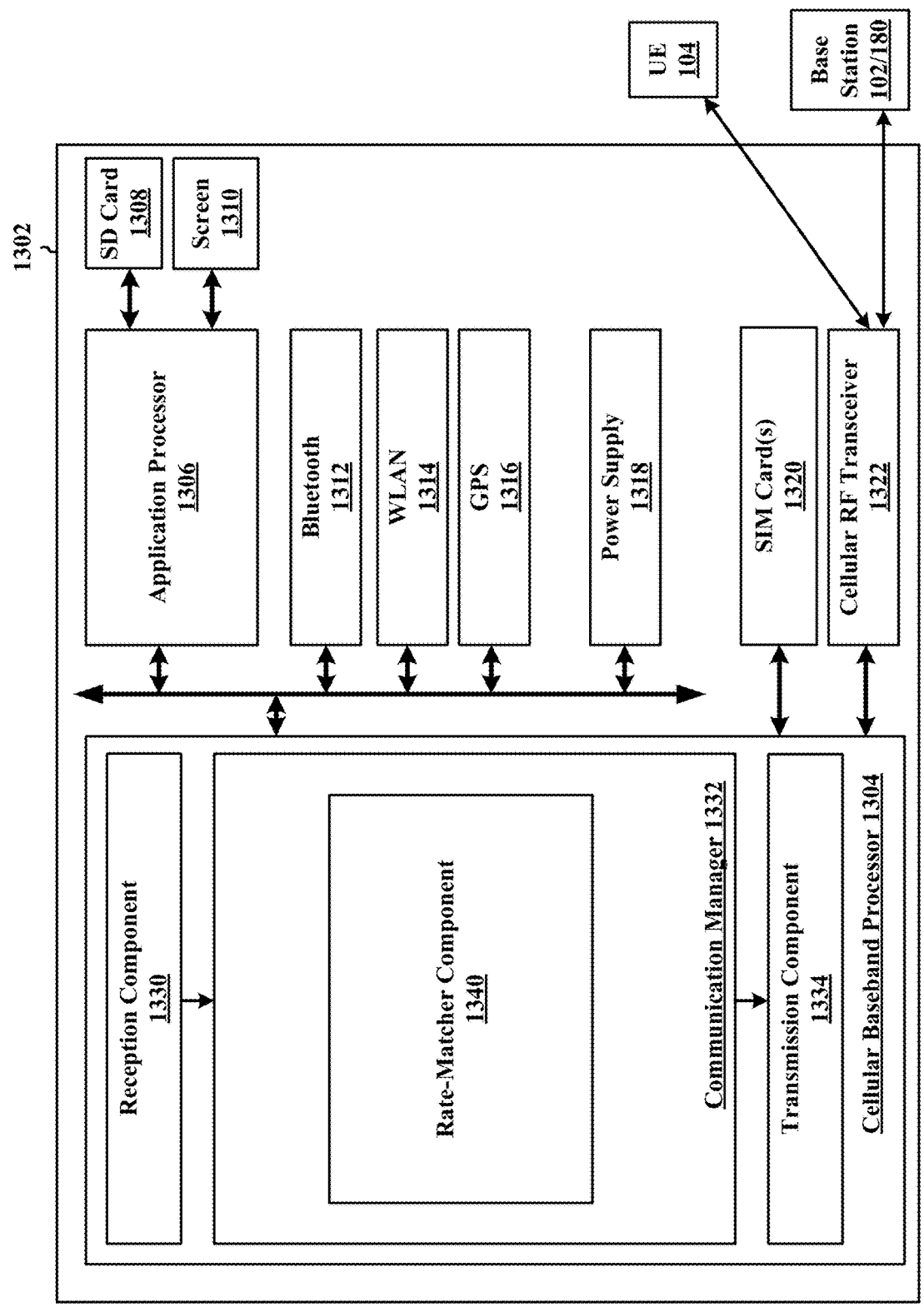
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., sec 350 of FIG. 3) and include the additional modules of the apparatus 1302.

The communication manager 1332 includes a rate-matcher component 1340 that is configured, e.g., as described in connection with 902-906 and 1002-1016, to receive an indication of a subset of one or more SSB beams included in a set of SSB beams having one or more PDCCH resources reserved for potentially scheduling one or more SIBs associated with the set of SSB beams; to transmit a report indicative of at least one of one or more of measured channel conditions associated with the set of SSB beams, a location of a UE, or beam steering information of the UE; to receive an updated indication of the subset of one or more SSB beams based on the report; to receive a configuration of a rate-matching rule for rate-matching around the one or more PDCCH resources reserved for potentially scheduling the one or more SIBs based on the configuration of the rate-matching rule; to receive a validity duration for the indication of the subset of one or more SSB beams for rate-matching around the one or more PDCCH resources associated with the indication of the one or more SSB beams; to receive a PDSCH associated with resources that overlap with at least a portion of the one or more PDCCH resources associated with the indication of the subset of one or more SSB beams; to rate-match around the one or more PDCCH resources associated with the indication of the subset of one or more SSB beams for receiving the PDSCH; to receive the PDSCH based on PDSCH resources that are at least partially overlapped with the one or more PDCCH resources reserved for potentially scheduling the one or more SIBs in association with other SSB beams that are separate from the subset of one or more SSB beams.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving an indication of a subset of one or more SSB beams included in a set of SSB beams having one or more PDCCH resources reserved for potentially scheduling one or more SIBs associated with the set of SSB beams; means for receiving a PDSCH associated with resources that overlap with at least a portion of the one or more PDCCH resources associated with the indication of the subset of one or more SSB beams; and means for rate-matching around the one or more PDCCH resources associated with the indication of the subset of one or more SSB beams for receiving the PDSCH. The apparatus 1302 further includes means for receiving a validity duration for the indication of the subset of one or more SSB beams, and means for rate-matching around the one or more PDCCH resources associated with the indication of the subset of one or more SSB beams for receiving the PDSCH based on the validity duration. The apparatus 1302 further includes means for transmitting a report indicative of at least one of one or more of measured channel conditions associated with the set of SSB beams, a location of the UE, or beam steering information of the UE. The apparatus 1302 further includes means for receiving an updated indication of the subset of one or more SSB beams based on the report. The apparatus 1302 further includes means for receiving the PDSCH based on PDSCH resources that are at least partially overlapped with the one or more PDCCH resources reserved for potentially scheduling the one or more SIBs in association with other SSB beams that are separate from the subset of one or more SSB beams. The apparatus 1302 further includes means for receiving a configuration of a rate-matching rule for rate-matching around the one or more PDCCH resources reserved for potentially scheduling the one or more SIBs based on the configuration of the rate-matching rule.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
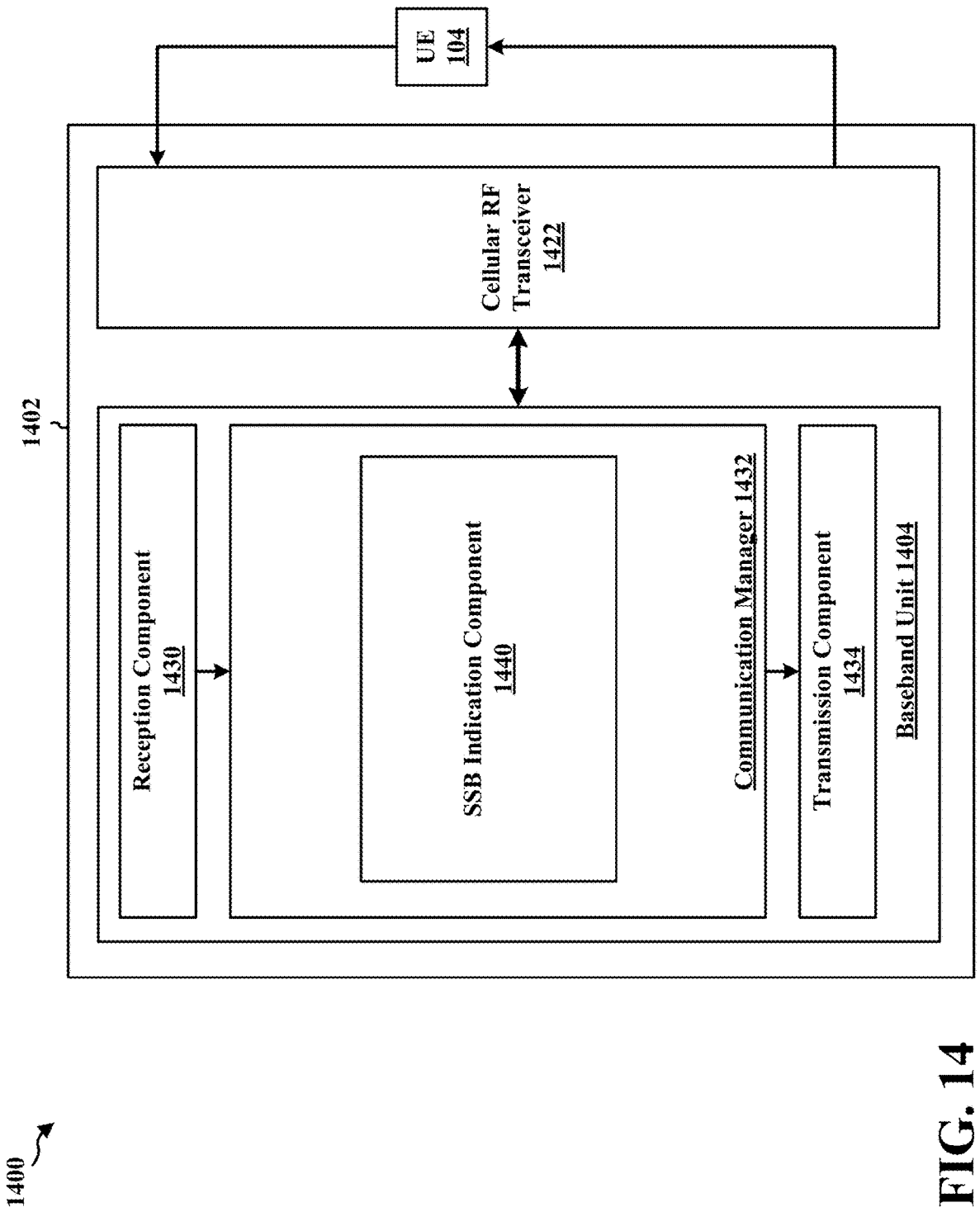
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes an SSB indication component 1440 that is configured, e.g., as described in connection with 1102-1106 and 1202-1216, to transmit, to a UE, an indication of a subset of one or more SSB beams included in a set of SSB beams having one or more PDCCH resources reserved for potentially scheduling one or more SIBs associated with the set of SSB beams; to receive a report from the UE indicative of at least one of one or more measured channel conditions associated with the set of SSB beams, a location of the UE, or beam steering information of the UE; to transmit an updated indication of the subset of one or more SSB beams based on the report received from the UE; to transmit a configuration of a rate-matching rule to the UE for rate-matching around the one or more PDCCH resources reserved for potentially scheduling the one or more SIBs based on the configuration of the rate-matching rule; to transmit a validity duration for the indication of the subset of one or more beams—the validity duration is associated with the rate-matching of the PDSCH transmission; to rate-match a PDSCH transmission around the one or more PDCCH resources associated with the indication of the subset of one or more SSB beams based on the one or more PDCCH resources being at least partially overlapped with resources of the PDSCH transmission; to transmit the PDSCH transmission to the UE based on the rate-matching of the PDSCH transmission around the one or more PDCCH resources associated with the indication of the subset of one or more SSB beams; to transmit the PDSCH transmission based on the resources of the PDSCH transmission being at least partially overlapped with the one or more PDCCH resources reserved for potentially scheduling the one or more SIBs in association with other SSB beams that are separate from the subset of one or more SSB beams.

The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting, to a UE, an indication of a subset of one or more SSB beams included in a set of SSB beams having one or more PDCCH resources reserved for potentially scheduling one or more SIBs associated with the set of SSB beams; means for rate-matching a PDSCH transmission around the one or more PDCCH resources associated with the indication of the subset of one or more SSB beams based on the one or more PDCCH resources being at least partially overlapped with resources of the PDSCH transmission; and means for transmitting the PDSCH transmission to the UE based on the rate-matching of the PDSCH transmission around the one or more PDCCH resources associated with the indication of the subset of one or more SSB beams. The apparatus 1402 further includes means for transmitting a validity duration for the indication of the subset of one or more beams, the validity duration associated with the rate-matching of the PDSCH transmission. The apparatus 1402 further includes means for receiving a report from the UE indicative of at least one of one or more measured channel conditions associated with the set of SSB beams, a location of the UE, or beam steering information of the UE. The apparatus 1402 further includes means for transmitting an updated indication of the subset of one or more SSB beams based on the report received from the UE. The apparatus 1402 further includes means for transmitting the PDSCH transmission based on the resources of the PDSCH transmission being at least partially overlapped with the one or more PDCCH resources reserved for potentially scheduling the one or more SIBs in association with other SSB beams that are separate from the subset of one or more SSB beams. The apparatus 1402 further includes means for transmitting a configuration of a rate-matching rule to the UE for rate-matching around the one or more PDCCH resources reserved for potentially scheduling the one or more SIBs based on the configuration of the rate-matching rule.

The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive an indication of a subset of one or more SSB beams included in a set of SSB beams having one or more PDCCH resources reserved for potentially scheduling one or more SIBs associated with the set of SSB beams; receive a PDSCH associated with resources that overlap with at least a portion of the one or more PDCCH resources associated with the indication of the subset of one or more SSB beams; and rate-match around the one or more PDCCH resources associated with the indication of the subset of one or more SSB beams for receiving the PDSCH.

Aspect 2 may be combined with aspect 1 and includes that the indication of the subset of one or more SSB beams is received based on a broadcast.

Aspect 3 may be combined with any of aspects 1-2 and includes that the indication of the subset of one or more SSB beams corresponds to at least one of a table, a function, or a rule that indexes the UE from one or more SSB serving beams to the subset of one or more SSB beams.

Aspect 4 may be combined with any of aspects 1-3 and includes that the indication of the subset of one or more SSB beams is received from the one or more SSB serving beams.

Aspect 5 may be combined with any of aspects 1-4 and includes that the at least one processor is further configured to: receive a validity duration for the indication of the subset of one or more SSB beams, and rate-match around the one or more PDCCH resources associated with the indication of the subset of one or more SSB beams for receiving the PDSCH based on the validity duration.

Aspect 6 may be combined with any of aspects 1-5 and includes that the indication of the subset of one or more SSB beams is comprised in at least one of an RRC message, a DCI, or a MAC-CE.

Aspect 7 may be combined with any of aspects 1-6 and includes that the at least one processor is further configured to transmit a report indicative of at least one of one or more of measured channel conditions associated with the set of SSB beams, a location of the UE, or beam steering information of the UE.

Aspect 8 may be combined with any of aspects 1-7 and includes that the at least one processor is further configured to receive an updated indication of the subset of one or more SSB beams based on the report.

Aspect 9 may be combined with any of aspects 1-8 and includes that the at least one processor is further configured to receive the PDSCH based on PDSCH resources that are at least partially overlapped with the one or more PDCCH resources reserved for potentially scheduling the one or more SIBs in association with other SSB beams that are separate from the subset of one or more SSB beams.

Aspect 10 may be combined with any of aspects 1-9 and includes that the at least one processor is further configured to receive a configuration of a rate-matching rule for rate-matching around the one or more PDCCH resources reserved for potentially scheduling the one or more SIBs based on the configuration of the rate-matching rule.

Aspect 11 may be combined with any of aspects 1-10 and includes that the rate-matching rule is for rate-matching around SSB transmission resources associated with the subset of one or more SSB beams for receiving a downlink transmission.

Aspect 12 may be combined with any of aspects 1-11 and includes that the PDSCH is received as a rate-matched PDSCH.

Aspect 13 may be combined with any of aspects 1-12 and includes that the UE receives the PDSCH and the indication of the subset of one or more SSB beams from an NTN device.

Aspect 14 may be combined with any of aspects 1-13 and further includes at least one of an antenna or a transceiver coupled to the at least one processor.

Aspect 15 is an apparatus for wireless communication at a network device including at least one processor coupled to a memory and configured to: transmit, to a UE, an indication of a subset of one or more SSB beams included in a set of SSB beams having one or more PDCCH resources reserved for potentially scheduling one or more SIBs associated with the set of SSB beams; rate-match a PDSCH transmission around the one or more PDCCH resources associated with the indication of the subset of one or more SSB beams based on the one or more PDCCH resources being at least partially overlapped with resources of the PDSCH transmission; and transmit the PDSCH transmission to the UE based on the rate-matching of the PDSCH transmission around the one or more PDCCH resources associated with the indication of the subset of one or more SSB beams.

Aspect 16 may be combined with aspect 15 and includes that the indication of the subset of one or more SSB beams is transmitted based on a broadcast from the network device.

Aspect 17 may be combined with any of aspects 15-16 and includes that the indication of the subset of one or more SSB beams corresponds to at least one of a table, a function, or a rule that indexes the UE from one or more SSB serving beams to the subset of one or more SSB beams.

Aspect 18 may be combined with any of aspects 15-17 and includes that the indication of the subset of one or more SSB beams is transmitted via the one or more SSB serving beams.

Aspect 19 may be combined with any of aspects 15-18 and includes that the at least one processor is further configured to transmit a validity duration for the indication of the subset of one or more beams, the validity duration associated with the rate-matching of the PDSCH transmission.

Aspect 20 may be combined with any of aspects 15-19 and includes that the indication of the subset of one or more SSB beams is comprised in at least one of an RRC message, a DCI, or a MAC-CE.

Aspect 21 may be combined with any of aspects 15-20 and includes that the at least one processor is further configured to receive a report from the UE indicative of at least one of one or more measured channel conditions associated with the set of SSB beams, a location of the UE, or beam steering information of the UE.

Aspect 22 may be combined with any of aspects 15-21 and includes that the at least one processor is further configured to transmit an updated indication of the subset of one or more SSB beams based on the report received from the UE.

Aspect 23 may be combined with any of aspects 15-22 and includes that the at least one processor is further configured to transmit the PDSCH transmission based on the resources of the PDSCH transmission being at least partially overlapped with the one or more PDCCH resources reserved for potentially scheduling the one or more SIBs in association with other SSB beams that are separate from the subset of one or more SSB beams.

Aspect 24 may be combined with any of aspects 15-23 and includes that the at least one processor is further configured to transmit a configuration of a rate-matching rule to the UE for rate-matching around the one or more PDCCH resources reserved for potentially scheduling the one or more SIBs based on the configuration of the rate-matching rule.

Aspect 25 may be combined with any of aspects 15-24 and includes that the rate-matching rule is for rate-matching around SSB transmission resources associated with the subset of one or more SSB beams for transmitting a downlink transmission.

Aspect 26 may be combined with any of aspects 15-25 and includes that the network device is an NTN device that transmits the PDSCH transmission and the indication of the subset of one or more SSB beams to the UE.

Aspect 27 may be combined with any of aspects 15-26 and further includes at least one of an antenna or a transceiver coupled to the at least one processor.

Aspect 28 is a method of wireless communication for implementing any of aspects 1-27.

Aspect 29 is an apparatus for wireless communication including means for implementing any of aspects 1-27.

Aspect 30 is a computer-readable medium storing computer executable code, the code when executed by at least one processor causes the at least one processor to implement any of aspects 1-27.

What is claimed is:

1. An apparatus for wireless communication at a user equipment (UE), comprising:
    memory; and
    at least one processor coupled to the memory and configured to:
       receive an indication of a subset of one or more synchronization signal block (SSB) beams included in a set of SSB beams having one or more physical downlink control channel (PDCCH) resources reserved for potentially scheduling one or more system information blocks (SIBs) associated with the set of SSB beams;
       receive a physical downlink shared channel (PDSCH) associated with resources that overlap with at least a portion of the one or more PDCCH resources associated with the indication of the subset of one or more SSB beams; and
       rate-match around the one or more PDCCH resources associated with the indication of the subset of one or more SSB beams for receiving the PDSCH.

2. The apparatus of claim 1, wherein to receive the indication of the subset of one or more SSB beams, the at least one processor is configured to receive the indication of the subset of one or more SSB beams based on a broadcast.

3. The apparatus of claim 2, wherein the indication of the subset of one or more SSB beams corresponds to at least one of a table, a function, or a rule that indexes the UE from one or more SSB serving beams to the subset of one or more SSB beams.

4. The apparatus of claim 3, wherein to receive the indication of the subset of one or more SSB beams, the at least one processor is configured to receive the indication of the subset of one or more SSB beams from the one or more SSB serving beams.

5. The apparatus of claim 1, wherein the at least one processor is further configured to:
    receive a validity duration for the indication of the subset of one or more SSB beams, and
    rate-match around the one or more PDCCH resources associated with the indication of the subset of one or more SSB beams for receiving the PDSCH based on the validity duration.

6. The apparatus of claim 1, wherein the indication of the subset of one or more SSB beams is comprised in at least one of a radio resource control (RRC) message, a downlink control information (DCI), or a medium access control-control element (MAC-CE).

7. The apparatus of claim 1, wherein the at least one processor is further configured to:
transmit a report indicative of at least one of one or more of measured channel conditions associated with the set of SSB beams, a location of the UE, or beam steering information of the UE.

8. The apparatus of claim 7, wherein the at least one processor is further configured to:
receive an updated indication of the subset of one or more SSB beams based on the report.

9. The apparatus of claim 1, wherein the at least one processor is further configured to:
receive the PDSCH based on PDSCH resources that are at least partially overlapped with the one or more PDCCH resources reserved for potentially scheduling the one or more SIBs in association with other SSB beams that are separate from the subset of one or more SSB beams.

10. The apparatus of claim 1, wherein the at least one processor is further configured to:
receive a configuration of a rate-matching rule for rate-matching around the one or more PDCCH resources reserved for potentially scheduling the one or more SIBs based on the configuration of the rate-matching rule.

11. The apparatus of claim 10, wherein the rate-matching rule is for rate-matching around SSB transmission resources associated with the subset of one or more SSB beams for receiving a downlink transmission.

12. The apparatus of claim 1, wherein to receive the PDSCH, the at least one processor is configured to receive the PDSCH as a rate-matched PDSCH.

13. The apparatus of claim 1, wherein to receive the PDSCH and the indication of the subset of one or more SSB beams, the at least one processor is configured to receive the PDSCH and the indication of the subset of one or more SSB beams from a non-terrestrial network (NTN) device.

14. The apparatus of claim 1, further comprising at least one of an antenna or a transceiver coupled to the at least one processor.

15. An apparatus for wireless communication at a network device, comprising:
memory; and
at least one processor coupled to the memory and configured to:
transmit, to a user equipment (UE), an indication of a subset of one or more synchronization signal block (SSB) beams included in a set of SSB beams having one or more physical downlink control channel (PDCCH) resources reserved for potentially scheduling one or more system information blocks (SIBs) associated with the set of SSB beams;
rate-match a physical downlink shared channel (PDSCH) transmission around the one or more PDCCH resources associated with the indication of the subset of one or more SSB beams based on the one or more PDCCH resources being at least partially overlapped with resources of the PDSCH transmission; and
transmit the PDSCH transmission to the UE based on the rate-matching of the PDSCH transmission around the one or more PDCCH resources associated with the indication of the subset of one or more SSB beams.

16. The apparatus of claim 15, wherein to transmit the indication of the subset of one or more SSB beams, the at least one processor is configured to transmit the indication of the subset of one or more SSB beams based on a broadcast from the network device.

17. The apparatus of claim 16, wherein the indication of the subset of one or more SSB beams corresponds to at least one of a table, a function, or a rule that indexes the UE from one or more SSB serving beams to the subset of one or more SSB beams.

18. The apparatus of claim 17, wherein to transmit the indication of the subset of one or more SSB beams, the at least one processor is configured to transmit the indication of the subset of one or more SSB beams via the one or more SSB serving beams.

19. The apparatus of claim 15, wherein the at least one processor is further configured to:
transmit a validity duration for the indication of the subset of one or more beams, the validity duration associated with the rate-matching of the PDSCH transmission.

20. The apparatus of claim 15, wherein the indication of the subset of one or more SSB beams is comprised in at least one of a radio resource control (RRC) message, a downlink control information (DCI), or a medium access control-control element (MAC-CE).

21. The apparatus of claim 15, wherein the at least one processor is further configured to:
receive a report from the UE indicative of at least one of one or more measured channel conditions associated with the set of SSB beams, a location of the UE, or beam steering information of the UE.

22. The apparatus of claim 21, wherein the at least one processor is further configured to:
transmit an updated indication of the subset of one or more SSB beams based on the report.

23. The apparatus of claim 15, wherein the at least one processor is further configured to:
transmit the PDSCH transmission based on the resources of the PDSCH transmission being at least partially overlapped with the one or more PDCCH resources reserved for potentially scheduling the one or more SIBs in association with other SSB beams that are separate from the subset of one or more SSB beams.

24. The apparatus of claim 15, wherein the at least one processor is further configured to:
transmit a configuration of a rate-matching rule to the UE for rate-matching around the one or more PDCCH resources reserved for potentially scheduling the one or more SIBs based on the configuration of the rate-matching rule.

25. The apparatus of claim 24, wherein the rate-matching rule is for rate-matching around SSB transmission resources associated with the subset of one or more SSB beams for transmitting a downlink transmission.

26. The apparatus of claim 15, wherein the network device is a non-terrestrial network (NTN) device.

27. The apparatus of claim 15, further comprising at least one of an antenna or a transceiver coupled to the at least one processor.

28. A method of wireless communication at a user equipment (UE), comprising:
receiving an indication of a subset of one or more synchronization signal block (SSB) beams included in a set of SSB beams having one or more physical downlink control channel (PDCCH) resources reserved for potentially scheduling one or more system information blocks (SIBs) associated with the set of SSB beams;

receiving a physical downlink shared channel (PDSCH) associated with resources that overlap with at least a portion of the one or more PDCCH resources associated with the indication of the subset of one or more SSB beams; and rate-matching around the one or more PDCCH resources associated with the indication of the subset of one or more SSB beams for receiving the PDSCH.

29. The method of claim 28, wherein the indication of the subset of one or more SSB beams is received based on a broadcast.

30. A method of wireless communication at a network device, comprising:

transmitting, to a user equipment (UE), an indication of a subset of one or more synchronization signal block (SSB) beams included in a set of SSB beams having one or more physical downlink control channel (PDCCH) resources reserved for potentially scheduling one or more system information blocks (SIBs) associated with the set of SSB beams;

rate-matching a physical downlink shared channel (PDSCH) transmission around the one or more PDCCH resources associated with the indication of the subset of one or more SSB beams based on the one or more PDCCH resources being at least partially overlapped with resources of the PDSCH transmission; and transmitting the PDSCH transmission to the UE based on the rate-matching of the PDSCH transmission around the one or more PDCCH resources associated with the indication of the subset of one or more SSB beams.

* * * * *